United States Patent
Cheng et al.

(10) Patent No.: US 10,795,137 B2
(45) Date of Patent: Oct. 6, 2020

(54) IMAGE-SPACE TELECENTRIC LENS

(71) Applicant: YOUNG OPTICS INC., Hsinchu (TW)

(72) Inventors: Hung-You Cheng, Hsinchu (TW);
Kai-Yun Chen, Hsinchu (TW);
Yu-Hung Chou, Hsinchu (TW)

(73) Assignee: YOUNG OPTICS INC., Hsinchu (TW)

( * ) Notice: Subject to any disclaimer, the term of this patent is extended or adjusted under 35 U.S.C. 154(b) by 377 days.

(21) Appl. No.: 15/087,249

(22) Filed: Mar. 31, 2016

(65) Prior Publication Data

US 2017/0285310 A1    Oct. 5, 2017

(51) Int. Cl.
*G02B 13/22* (2006.01)
*G02B 13/16* (2006.01)
*G02B 13/00* (2006.01)
*G02B 27/00* (2006.01)

(52) U.S. Cl.
CPC ........... *G02B 13/22* (2013.01); *G02B 13/004* (2013.01); *G02B 13/006* (2013.01); *G02B 13/0045* (2013.01); *G02B 13/16* (2013.01); *G02B 27/0025* (2013.01)

(58) Field of Classification Search
CPC .. G02B 13/22; G02B 13/004; G02B 13/0045; G02B 13/006; G02B 13/16; G02B 27/0025
USPC .......................... 359/633, 641, 642, 362, 691
See application file for complete search history.

(56) References Cited

U.S. PATENT DOCUMENTS

| | | | | |
|---|---|---|---|---|
| 5,805,359 A | * | 9/1998 | Yamanashi | G02B 13/00 359/686 |
| 5,914,818 A | * | 6/1999 | Tejada | G02B 13/02 359/663 |
| 6,712,474 B2 | | 3/2004 | Narimatsu | |
| 7,173,777 B1 | * | 2/2007 | Lu | G02B 13/06 359/642 |
| 7,450,318 B2 | * | 11/2008 | Nanba | G02B 15/177 359/680 |
| 7,656,587 B2 | | 2/2010 | Hsu et al. | |
| 8,693,109 B2 | | 4/2014 | Yanagisawa | |

(Continued)

FOREIGN PATENT DOCUMENTS

CN    102540422 B    7/2012

OTHER PUBLICATIONS

Schott Data sheet, Jan. 17, 2017.*

(Continued)

*Primary Examiner* — Travis S Fissel
(74) *Attorney, Agent, or Firm* — Muncy, Geissler Olds & Lowe, P.C.

(57) ABSTRACT

An image-space telecentric lens includes, in order from a magnified side to a minified side, a first lens group of negative refractive power, an aperture stop, and a second lens group of positive refractive power. The first lens group has at least one aspheric surface, and the second lens group has at least one aspheric surface. The second lens group has a cemented lens of positive refractive power, and the cemented lens is nearest the aperture stop as compared with other lens in the second lens group. The image-space telecentric lens satisfies the condition: TT<100 mm, where TT denotes a length measured along an optical axis and between two outermost opposite lens surfaces of the image-space telecentric lens.

15 Claims, 21 Drawing Sheets

(56) References Cited

U.S. PATENT DOCUMENTS

| | | | | |
|---|---|---|---|---|
| 2004/0257666 | A1* | 12/2004 | Komatsu | G02B 13/16 |
| | | | | 359/649 |
| 2005/0117228 | A1* | 6/2005 | Kim | G02B 9/04 |
| | | | | 359/793 |
| 2005/0122598 | A1* | 6/2005 | Kobayashi | G02B 13/18 |
| | | | | 359/754 |
| 2006/0176576 | A1* | 8/2006 | Nagahara | G02B 13/16 |
| | | | | 359/680 |
| 2007/0217027 | A1* | 9/2007 | Iijima | G02B 15/177 |
| | | | | 359/692 |
| 2009/0109543 | A1* | 4/2009 | Nagatoshi | G02B 13/16 |
| | | | | 359/663 |
| 2013/0235464 | A1* | 9/2013 | Yun | G02B 13/16 |
| | | | | 359/650 |
| 2014/0126039 | A1 | 5/2014 | Chen et al. | |
| 2014/0153113 | A1* | 6/2014 | Tsai | G02B 13/18 |
| | | | | 359/713 |
| 2014/0160338 | A1* | 6/2014 | Kikuchi | G02B 13/18 |
| | | | | 348/333.09 |
| 2014/0240851 | A1* | 8/2014 | Kawamura | G02B 13/04 |
| | | | | 359/708 |
| 2015/0338621 | A1* | 11/2015 | Jang | G02B 15/177 |
| | | | | 359/691 |

OTHER PUBLICATIONS

Optics Material, GS Optics, http://www.gsoptics.com/materials/.*
Index of refraction site: https://refractiveindex.info (Year: 2019).*

* cited by examiner

IMAGE-SPACE TELECENTRIC LENS

BACKGROUND OF THE INVENTION a. Field of the Invention

The invention relates generally to an optical lens, and more particularly to an image-space telecentric lens adapted for, for example, projection purposes.

b. Description of the Related Art

Nowadays, there is a growing need for a higher resolution, larger image circle, and reduced total length for a compact lens system used in small projectors. However, reducing the number of lenses may shorten the total length of the lens system, but may in turn lower the image resolution. It is a trade-off between the size and optical performance or other factor in the lens system for a microprojector. Therefore, it is desirable to provide a high-performance image-space telecentric lens that may balance all demands and is favorable for correcting aberrations.

BRIEF SUMMARY OF THE INVENTION

According to one aspect of the present disclosure, an image-space telecentric lens includes, in order from a magnified side to a minified side, a first lens group of negative refractive power, an aperture stop, and a second lens group of positive refractive power. The first lens group has at least one aspheric surface, and the second lens group has at least one aspheric surface. The second lens group has a cemented lens of positive refractive power, and the cemented lens is nearest the aperture stop as compared with other lens in the second lens group. The image-space telecentric lens satisfies the condition: TT<100 mm, where TT denotes a length measured along an optical axis and between two outermost opposite lens surfaces of the image-space telecentric lens.

According to the above embodiment, since the second lens group has a cemented lens immediately adjacent to the aperture stop, the cemented lens of positive refractive power is allowed to balance chromatic aberration and reduce optical distortion. Further, because the first lens group or the second lens group may include at least one aspheric lens surface, the aberration is reduced, and the number of required lenses can be reduced on constructing an image-space telecentric lens to reduce the total track length. Accordingly, the image-space telecentric lens is featured with good correction ability, reduced size, and improved image quality.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIG. 2 is a through focus MTF diagram, and FIG. 4 is a spatial frequency MTF diagram. FIG. 3A illustrates astigmatic field curves, and FIG. 3B illustrates percentage distortion curves.

FIG. 6 is a through focus MTF diagram, and FIG. 8 is a spatial frequency MTF diagram. FIG. 7A illustrates astigmatic field curves, and FIG. 7B illustrates percentage distortion curves.

FIG. 10 is a through focus MTF diagram, and FIG. 12 is a spatial frequency MTF diagram. FIG. 11A illustrates astigmatic field curves, and FIG. 11B illustrates percentage distortion curves.

FIG. 14 is a through focus MTF diagram, and FIG. 16 is a spatial frequency MTF diagram. FIG. 15A illustrates astigmatic field curves, and FIG. 15B illustrates percentage distortion curves.

FIG. 18 is a through focus MTF diagram, and FIG. 20 is a spatial frequency MTF diagram. FIG. 19A illustrates astigmatic field curves, and FIG. 19B illustrates percentage distortion curves.

DETAILED DESCRIPTION OF THE INVENTION

Figure 1:
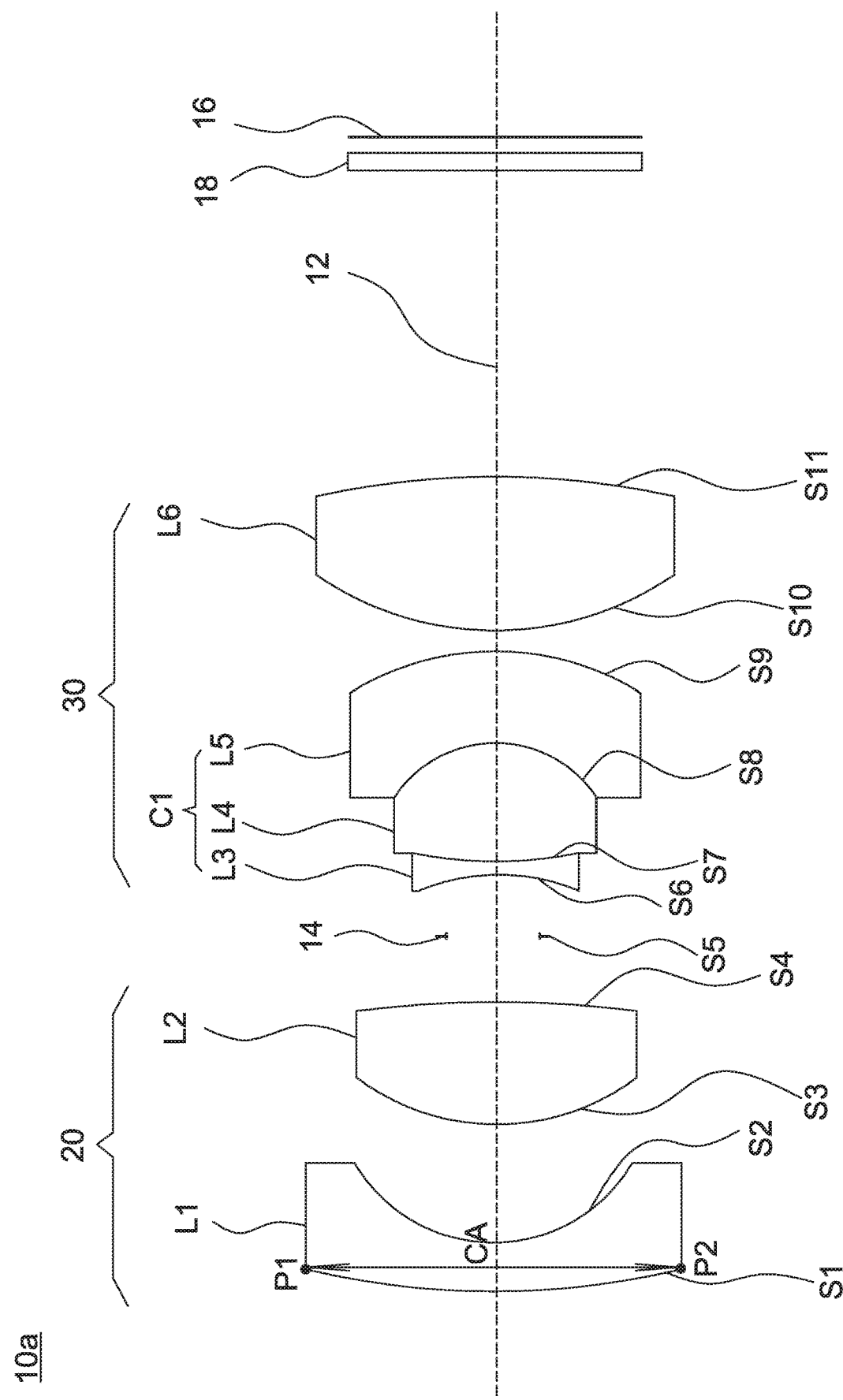
FIG. 1 shows a schematic diagram illustrating an image-space telecentric lens according to an embodiment of the invention.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Embodiments of the invention relate to an image-space telecentric lens. Typically, a telecentric lens is a compound lens that has its entrance or exit pupil at infinity to produce an orthographic view of the subject. This means that the chief rays (oblique rays that pass through the center of an aperture stop) are parallel to the optical axis in front of or behind the system, respectively. An exit pupil at infinity makes the lens image-space telecentric. An image-space telecentric lens produces images of the same size regardless of the distance between the lens and the film or image sensor. This allows the lens to be focused to different distances without changing the size of the image. Image-space telecentric lenses have an exit pupil infinitely far in front of the lens; that is, if one looks in the back of the lens, the image of the aperture is very far away. At the film or image sensor, all of the chief rays from these lenses may hit "straight on", or at zero angle of incidence. This property may minimize any angle-of-incidence dependence of the sensor, or of any beam-splitter prism assembly behind the lens. An image-space telecentric lens according to an embodiment of the invention may include a first lens group of negative refractive power and a second lens group of positive refractive power. The first lens group or the second lens group may include at least one aspherical lens surface for correcting different kinds of optical aberrations. Besides, the second lens group may include a cemented lens of positive refractive power that is nearest an aperture stop compared with other lens in the second lens group to balance chromatic aberration and reduce optical distortion. Note that adjoining surfaces of each two adjacent lenses in a cemented lens have an identical radius of curvature, and that the lenses in a cemented lens can be joined together by various ways. For example, the lenses may be cemented together by applying an optical adhesive on lens surfaces, stacked with each other and then stuck together by adhesive dispensing, or stacked and then pressed to be fitted with each other. Because the first lens group or the second lens group may include at least one aspheric lens surface, more controllable variables are obtained, and the aberration is reduced, as well as the number of required lenses can be reduced on constructing an image-space telecentric lens to reduce the total track length.

Figure 21:
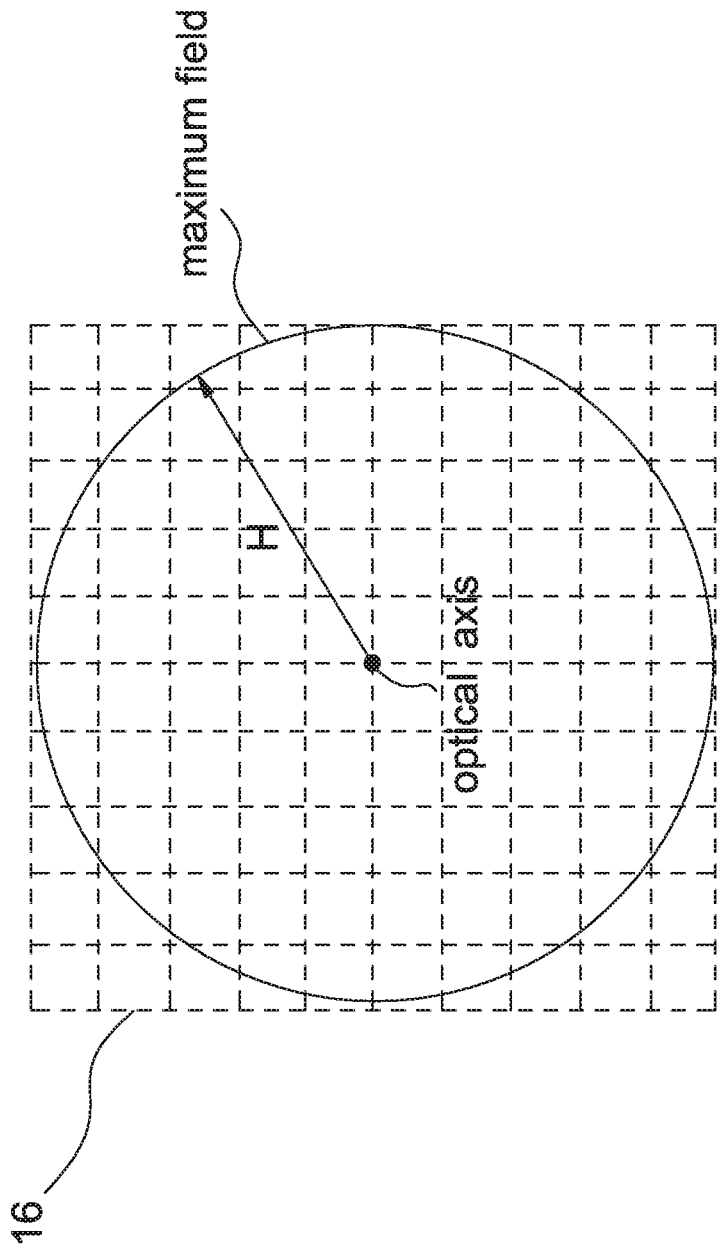
FIG. 21 shows a schematic diagram illustrating the definition of an image height according to an embodiment of the invention.

The image-space telecentric lens according to one embodiment may satisfy the following condition:

$0.5 < H/EFL < 0.94$, where H denotes a maximum image height at the minified side, and EFL denotes an effective focal length of the image-space telecentric lens. FIG. 21 exemplified a maximum image height H measured on a spatial light modulator 16 (such as a digital micro-mirror device). As shown in FIG. 21, the maximum image height H is defined as a maximum image circle radius of the image-space telecentric lens. According to this embodiment, a throw ratio of the image-space telecentric lens may be in the range of 0.8-1.5. The throw ratio may be equal to a value of D/W, where D denotes a distance from a screen (not shown) to a projector (not shown) and W denotes a width of the screen. Further, an F number of the image-space telecentric lens may be in the range of 1.7-2.4.

Further, the image-space telecentric lens according to one embodiment may satisfy the following condition:

$2.5 < TT/EFL < 6.5$, where TT denotes a length measured along an optical axis and between two outermost opposite lens surfaces of the image-space telecentric lens, and EFL denotes an effective focal length of the image-space telecentric lens. For example, the two outermost opposite lens surfaces shown in FIG. 1 are the lens surface 1 and the lens surface 11. Further, the length TT may be smaller than 100 mm in one embodiment, and may be smaller than 60 mm in an alternate embedment.

In another embodiment, a throw ratio of the image-space telecentric lens may be in the range of 1-1.2, and an F number of the image-space telecentric lens may be in the range of 1.7-2.1

In one embodiment, the image-space telecentric lens according to one embodiment may satisfy the following condition:

$CA/H < 5$, where H denotes a maximum image height at the minified side, CA denotes a clear aperture defined as a length between two opposite points of discontinuity of a magnified-side surface of a lens nearest the magnified-side, with the length being measured in a direction perpendicular to an optical axis of the image-space telecentric lens. For example, as shown in FIG. 1, a clear aperture CA of an image-space telecentric lens 10a is the vertical length between two opposite points P1 and P2 of discontinuity of a magnified-side surface S1 of a lens L1 nearest the magnified-side (on the left of FIG. 1). In an alternate embodiment, the condition: $CA/H < 4$ is also satisfied.

According to the above embodiments, the image-space telecentric lens is featured with good correction ability, reduced size, and improved image quality.

A first design example of an image-space telecentric lens 10a is described in detail below with reference to FIG. 1. As illustrated in FIG. 1, a spatial light modulator (or a light valve) 16, for example, a digital micro-mirror device (DMD), an LCD or an LCOS, selectively reflects illumination light to produce image light, and the image light may pass through a cover plate 18, a second lens group 30, an aperture stop 14, and a first lens group 20 in succession, and then the image light may be projected onto an object (not shown) to form projection images. The first lens group 20 includes two lenses L1 and L2 arranged in order, along an optical axis 12, from a magnified side (on the left of FIG. 1) to a minified side (on the right of FIG. 1). The second lens group 30 includes four lenses L3, L4, L5 and L6 arranged in order, along the optical axis 12, from the magnified side to the minified side. The refractive powers of the lens L1, L2, L3, L4, L5 and L6 are negative, positive, negative, positive, negative and positive, respectively. The lens L1 of the first lens group 20 and the lens L6 of the second lens group 30 are aspheric lenses. The aspheric lenses L1 and L6 may have a refractive index in the range of 1.48-1.55. The lens L3, lens L4 and lens L5 are joined together as one piece to form a cemented triplet C1 having positive refractive power. The aperture stop 14 is located between the lens L2 and the cemented triplet C1. The lens L1 has a convex magnified-side surface S1 and a concave minified-side surface S2, the lens L2 has a convex magnified-side surface S3 and a convex minified-side surface S4, the lens L3 has a concave magnified-side surface S6, the lens L4 has a convex magnified-side surface S7, the lens L5 has a concave magnified-side surface S8 and a convex minified-side surface S9, the lens L6 has a convex magnified-side surface S10 and a convex minified-side surface S11.

According to the image-space telecentric lens of the embodiments, each of a magnified-side surface and a minified-side surface of a lens has a paraxial region and a peripheral region. The paraxial region refers to the region of the surface where light rays travel close to an optical axis and the peripheral region refers to the region of the surface where light rays travel away from the optical axis. Particularly, when a lens has a convex surface, it may indicate that the surface is convex at the paraxial region; and when the lens has a concave surface, it may indicate that the surface is concave at the paraxial region.

The detailed optical data of the first example are shown in Table 1 and Table 2 below.

TABLE 1

| Surface | object | radius (mm) | thickness (mm) | refractive index | Abbe number |
|---|---|---|---|---|---|
| S1 | LensL1(meniscus) | 23.43 | 1.41 | 1.525 | 56.3 |
| S2 | | 4.01 | 4.14 | | |
| S3 | Lens L2(biconvex) | 8.61 | 3.69 | 1.834 | 37.2 |
| S4 | | −98.59 | 2.53 | | |
| S5 | Stop | ∞ | 2.02 | | |

TABLE 1-continued

| Surface | object | radius (mm) | thickness (mm) | refractive index | Abbe number |
|---|---|---|---|---|---|
| S6 | Lens L3(biconcave) | −7.12 | 0.65 | 1.517 | 52.4 |
| S7 | Lens L4(biconvex) | 12.75 | 3.88 | 1.618 | 63.3 |
| S8 | Lens L5(meniscus) | −4.41 | 3.15 | 1.923 | 18.9 |
| S9 | | −8.85 | 0.72 | | |
| S10 | Lens L6(biconvex) | 11.47 | 5.10 | 1.525 | 56.3 |
| S11 | | −20.18 | 1.18 | | |

TABLE 2

| EFL (mm) | 7.92 |
|---|---|
| TT (mm) | 27.29 |
| H (mm) | 4.95 |
| CA(mm) | 12.60 |
| F number | 2.00 |
| Throw ratio | 1.20 |
| TT/EFL | 3.45 |
| H/EFL | 0.63 |
| CA/H | 2.54 |

Further, the aspheric surface satisfies the following equation:

$$x = \frac{c'y^2}{1+\sqrt{1-(1+k)c'^2 y^2}} + Ay^4 + By^6 + Cy^8 + Dy^{10} + Ey^{12} + Fy^{14} + Gy^{16} \ldots ,$$

where x denotes a displacement from the vertex of a lens in the direction of the optical axis 12, c' denotes a reciprocal of the radius of curvature at the vertex of a lens (approaching the optical axis 12), K denotes a Conic constant, y denotes a height (distance in the direction perpendicular to the optical axis 12) of the aspheric surface, and A, B, C, D, E, F and G are aspheric coefficients. The values of aspheric coefficients and Conic constant of each lens surface are listed in Table 3.

TABLE 3

| Lens surface | S1 | S2 | S10 | S11 |
|---|---|---|---|---|
| K | −8.18E+01 | −9.42E−01 | 0 | 0 |
| A | −1.62E−04 | −7.42E−04 | −2.65E−05 | 3.14E−04 |
| B | 4.18E−06 | 3.84E−05 | −5.45E−07 | −6.99E−07 |
| C | −7.41E−08 | −1.14E−06 | 4.37E−08 | 6.34E−09 |
| D | 5.90E−10 | 1.69E−08 | 8.35E−11 | 1.27E−09 |

Figure 2:
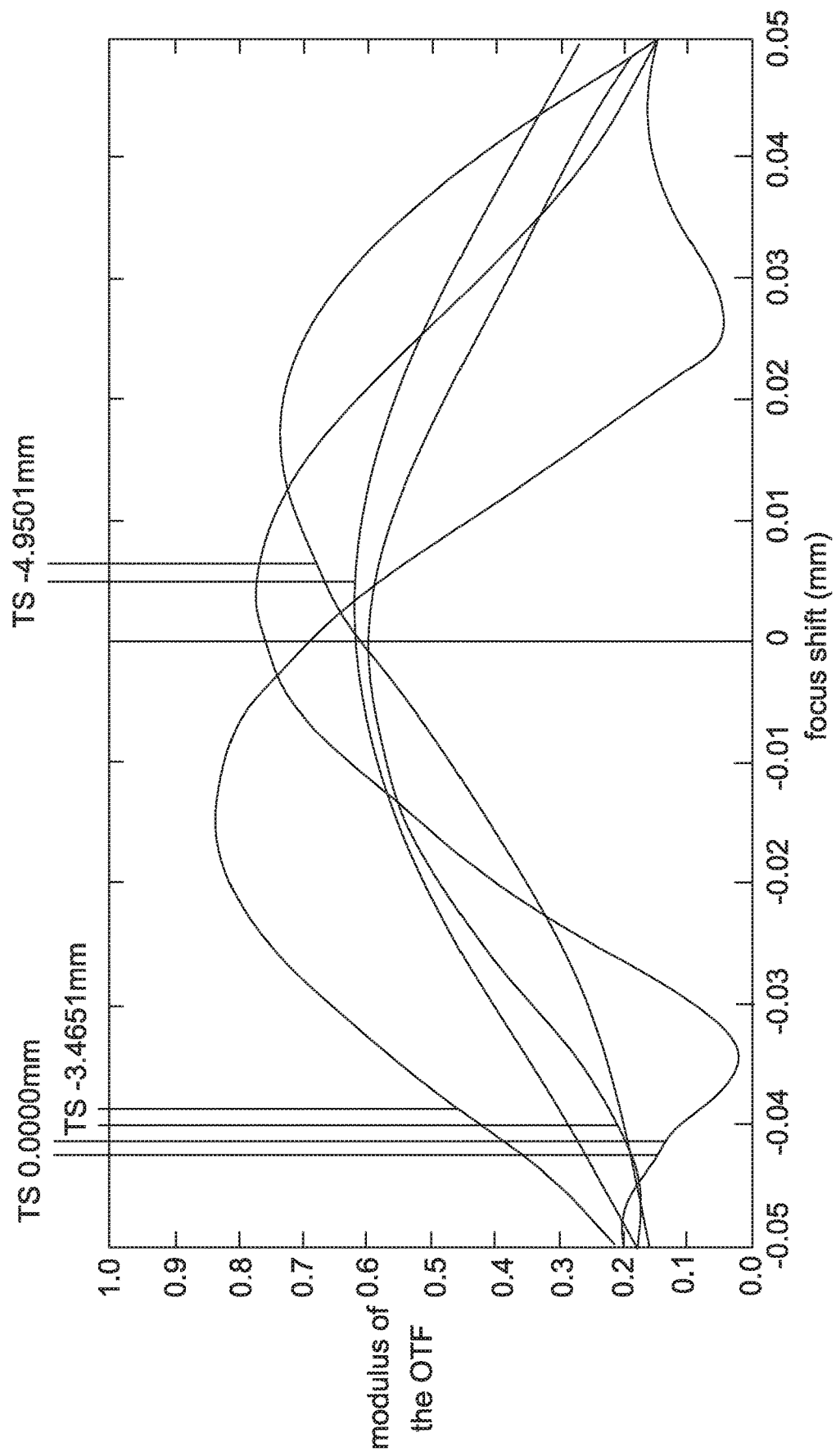
FIGS. 2, 3A, 3B and 4 show optical simulation results of the image-space telecentric lens shown in FIG. 1.
Figures 3A, 3B:
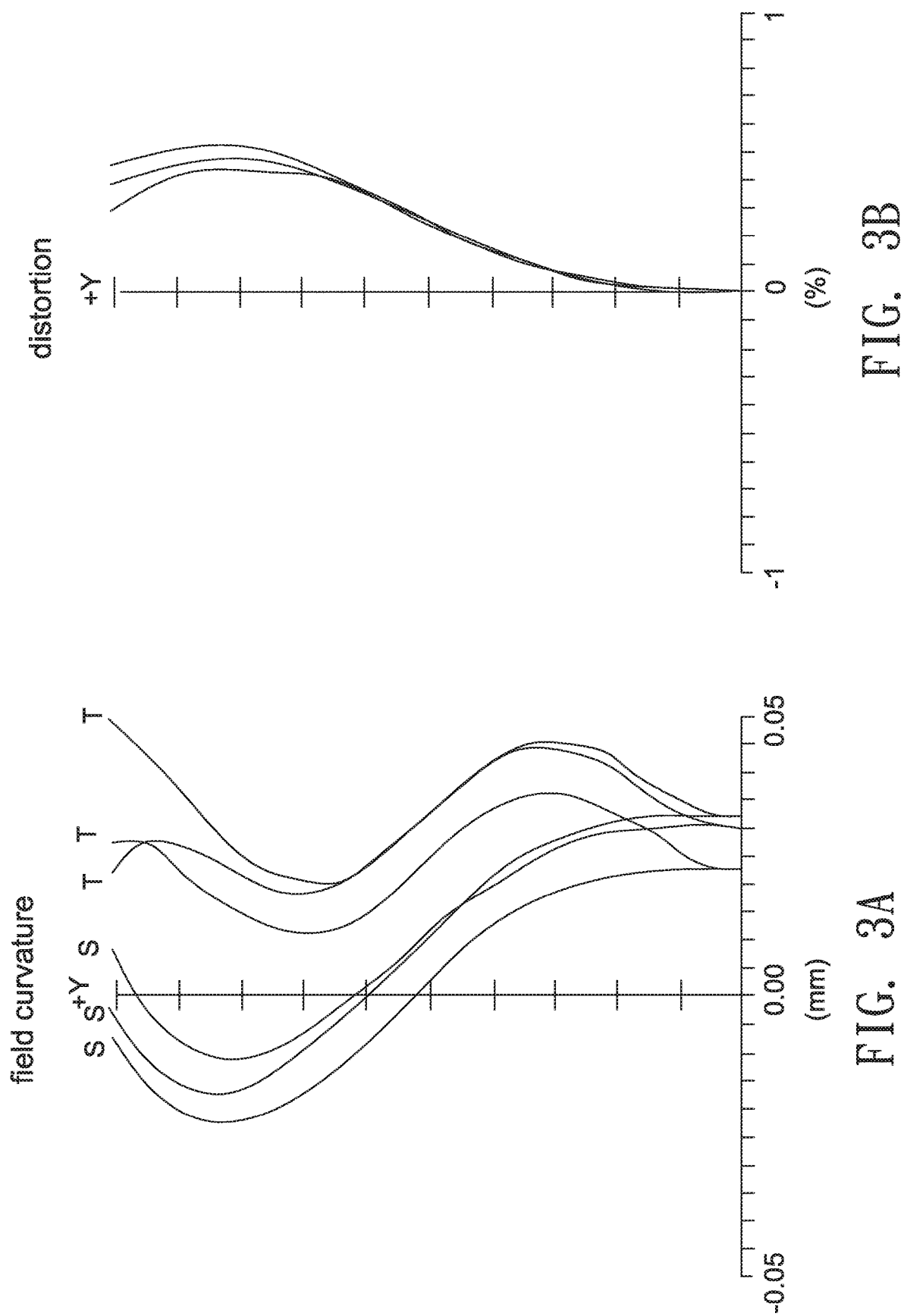
Figure 4:
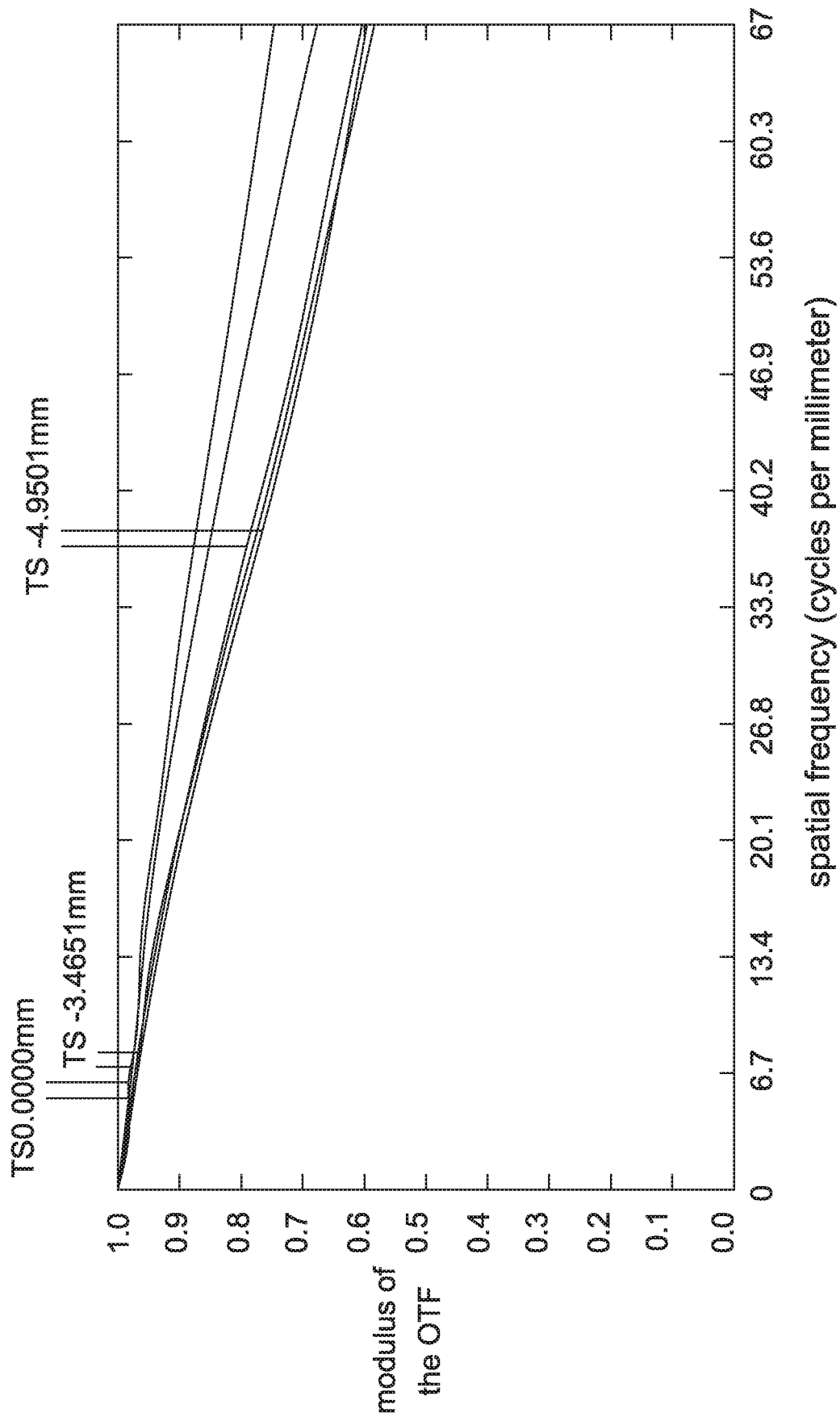

FIGS. 2-4 show optical simulation results of the image-space telecentric lens shown in FIG. 1. FIG. 2 is a through focus MTF diagram, and FIG. 4 is a spatial frequency MTF diagram. FIG. 3A illustrates astigmatic field curves, and FIG. 3B illustrates percentage distortion curves, where it shows that an absolute value of a maximum optical distortion is smaller than 0.6%.

A second design example of an image-space telecentric lens 10b including six lenses L1-L6 (with respective refractive power of negative, positive, negative, positive, negative and positive) is described in detail below with reference to FIG. 5. The lens L3, lens L4 and lens L5 are joined together as one piece to form a cemented triplet C1 having positive refractive power. The detailed optical data of the second example are shown in Table 4 and Table 5, and the aspheric surface data are shown in Table 6 below.

TABLE 4

| Surface | object | radius (mm) | thickness (mm) | refractive index | Abbe number |
|---|---|---|---|---|---|
| S1 | LensL1(meniscus) | 18.06 | 1.50 | 1.525 | 56.3 |
| S2 | | 3.78 | 6.15 | | |
| S3 | Lens L2(biconvex) | 11.52 | 3.23 | 1.806 | 40.9 |
| S4 | | −33.37 | 2.73 | | |
| S5 | Stop | ∞ | 2.86 | | |
| S6 | Lens L3(biconcave) | −10.37 | 0.80 | 1.548 | 45.8 |
| S7 | Lens L4(biconvex) | 11.44 | 4.39 | 1.618 | 63.3 |
| S8 | Lens L5(meniscus) | −5.12 | 0.80 | 1.847 | 23.8 |
| S9 | | −9.49 | 3.44 | | |
| S10 | Lens L6(biconvex) | 10.86 | 3.05 | 1.525 | 56.3 |
| S11 | | −35.73 | 0.81 | | |

TABLE 5

| | |
|---|---|
| EFL (mm) | 7.91 |
| TT (mm) | 28.95 |
| H (mm) | 4.95 |
| CA(mm) | 13.60 |
| F number | 2.10 |
| Throw ratio | 1.20 |
| TT/EFL | 3.66 |
| H/EFL | 0.63 |
| CA/H | 2.74 |

TABLE 6

| Lens surface | S1 | S2 | S10 | S11 |
|---|---|---|---|---|
| K | −4.57E+01 | −8.04E−01 | 0 | 0 |
| A | −2.25E−04 | −1.21E−03 | −3.46E−05 | 2.86E−04 |
| B | 6.28E−06 | 3.63E−05 | −4.64E−06 | −6.30E−06 |
| C | −9.02E−08 | −7.75E−07 | 8.82E−08 | 1.17E−07 |

TABLE 6-continued

| Lens surface | S1 | S2 | S10 | S11 |
|---|---|---|---|---|
| D | 4.14E−10 | 3.47E−09 | 7.61E−11 | −7.37E−10 |
| E | 1.59E−12 | 5.68E−11 | −4.24E−11 | −3.18E−11 |

Figure 5:
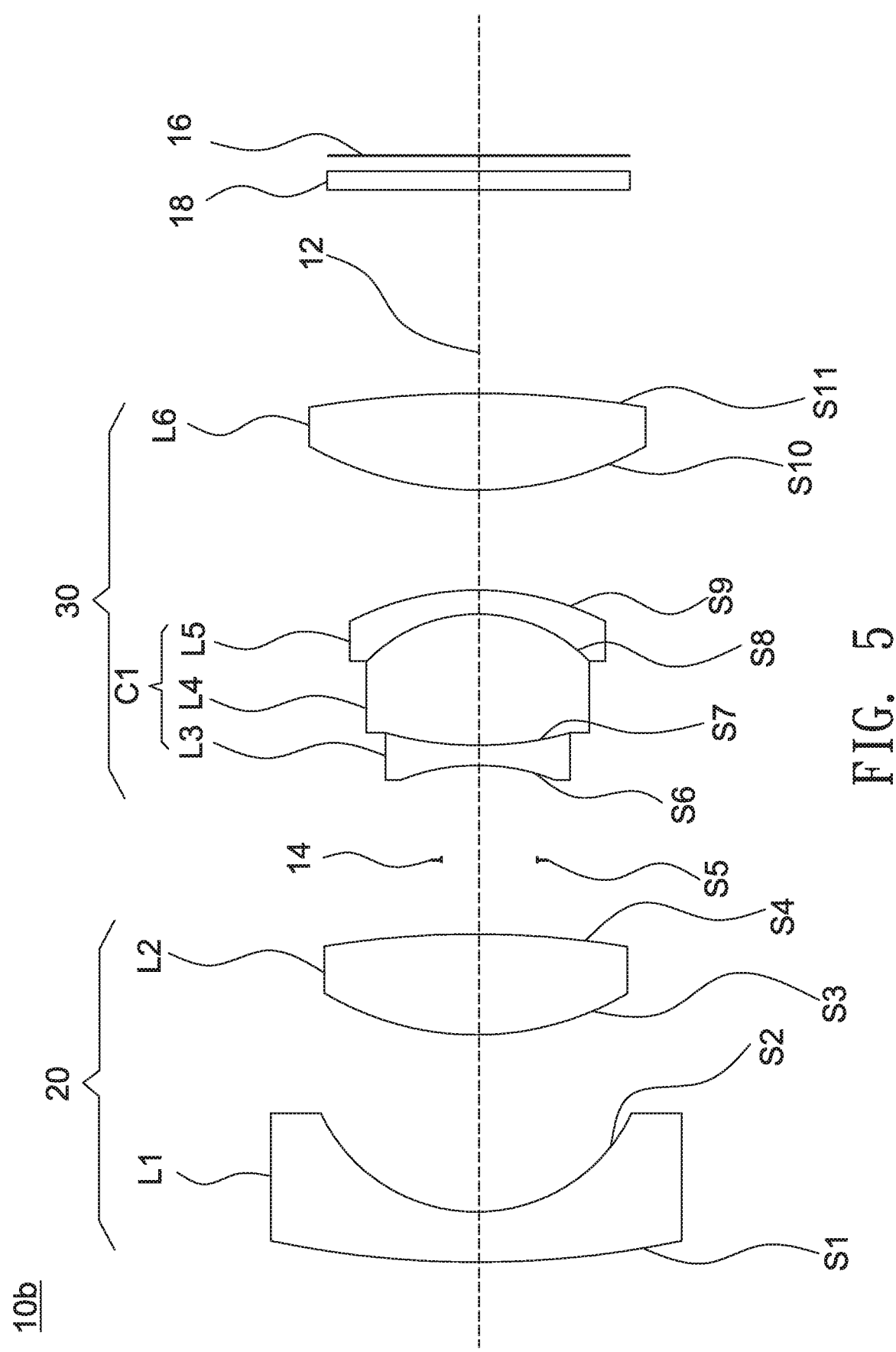
FIG. 5 shows a schematic diagram illustrating an image-space telecentric lens according to another embodiment of the invention.
Figure 6:
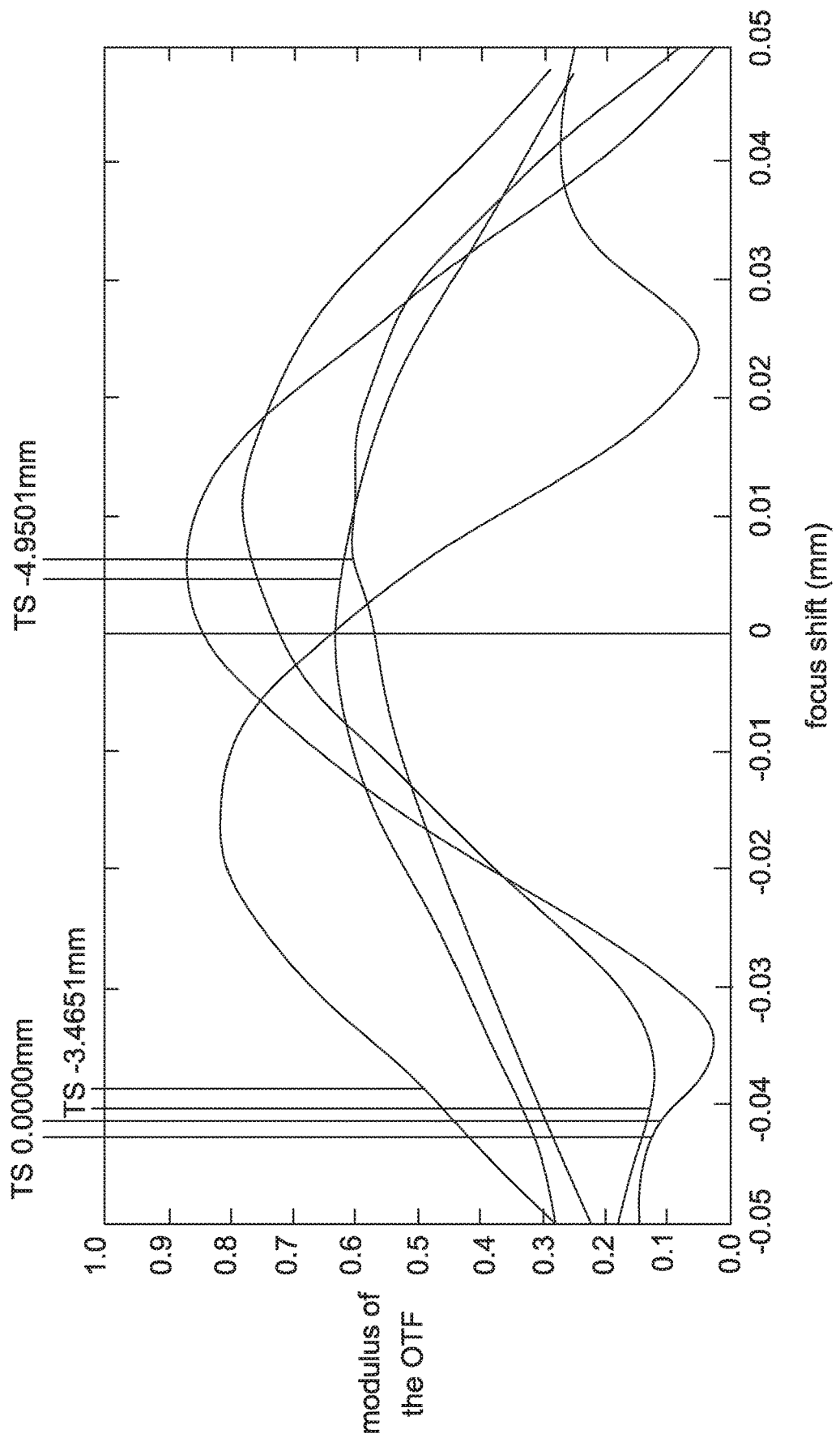
FIGS. 6, 7A, 7B and 8 show optical simulation results of the image-space telecentric lens shown in FIG. 5.
Figure 7B:
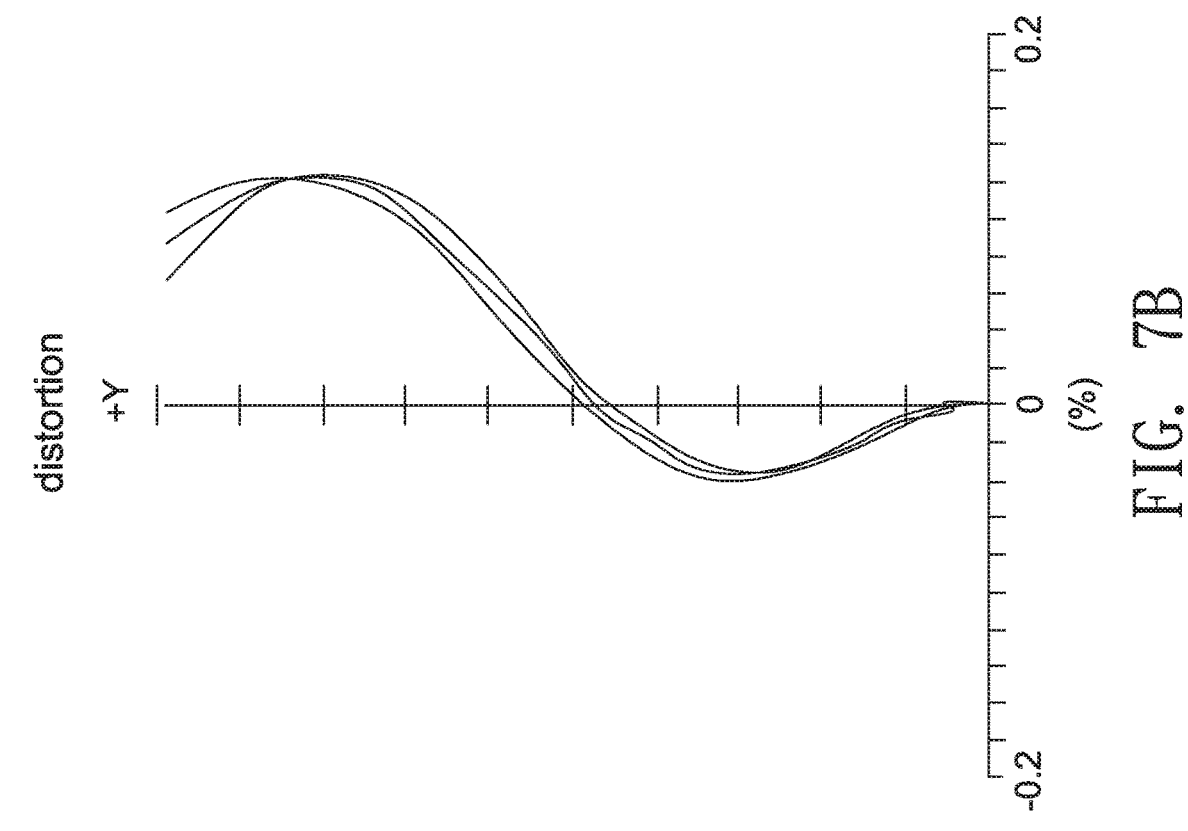
Figure 7A:
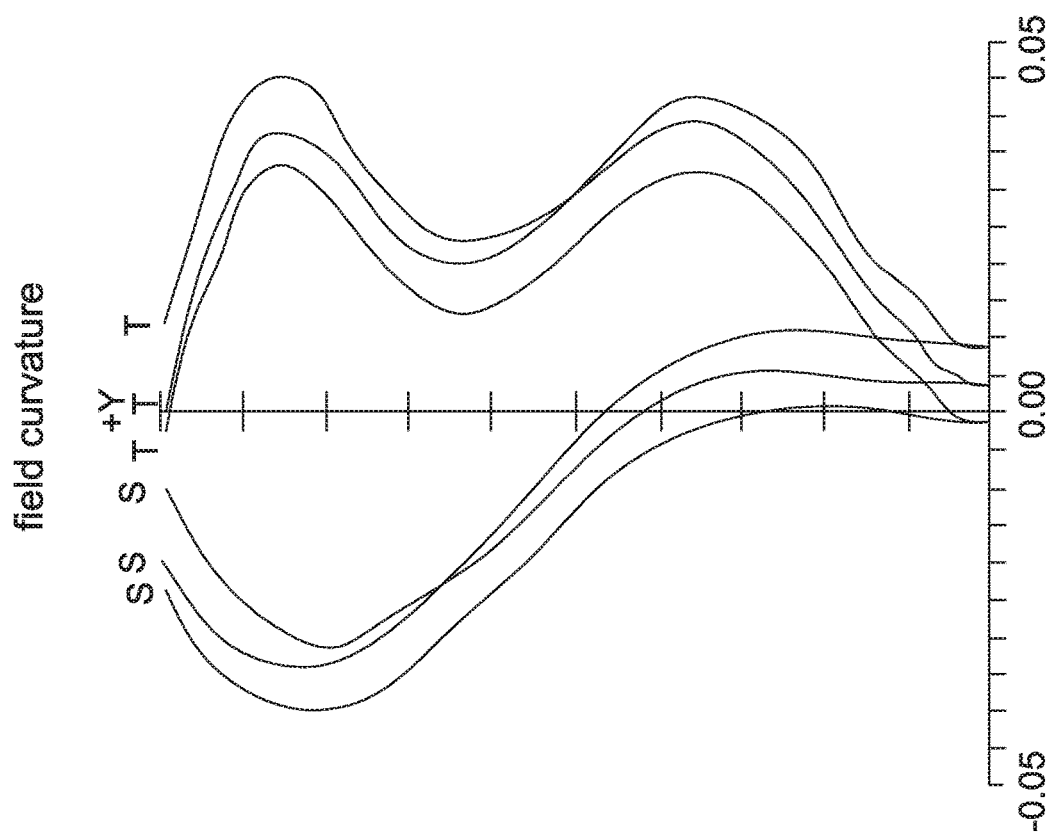
Figure 8:
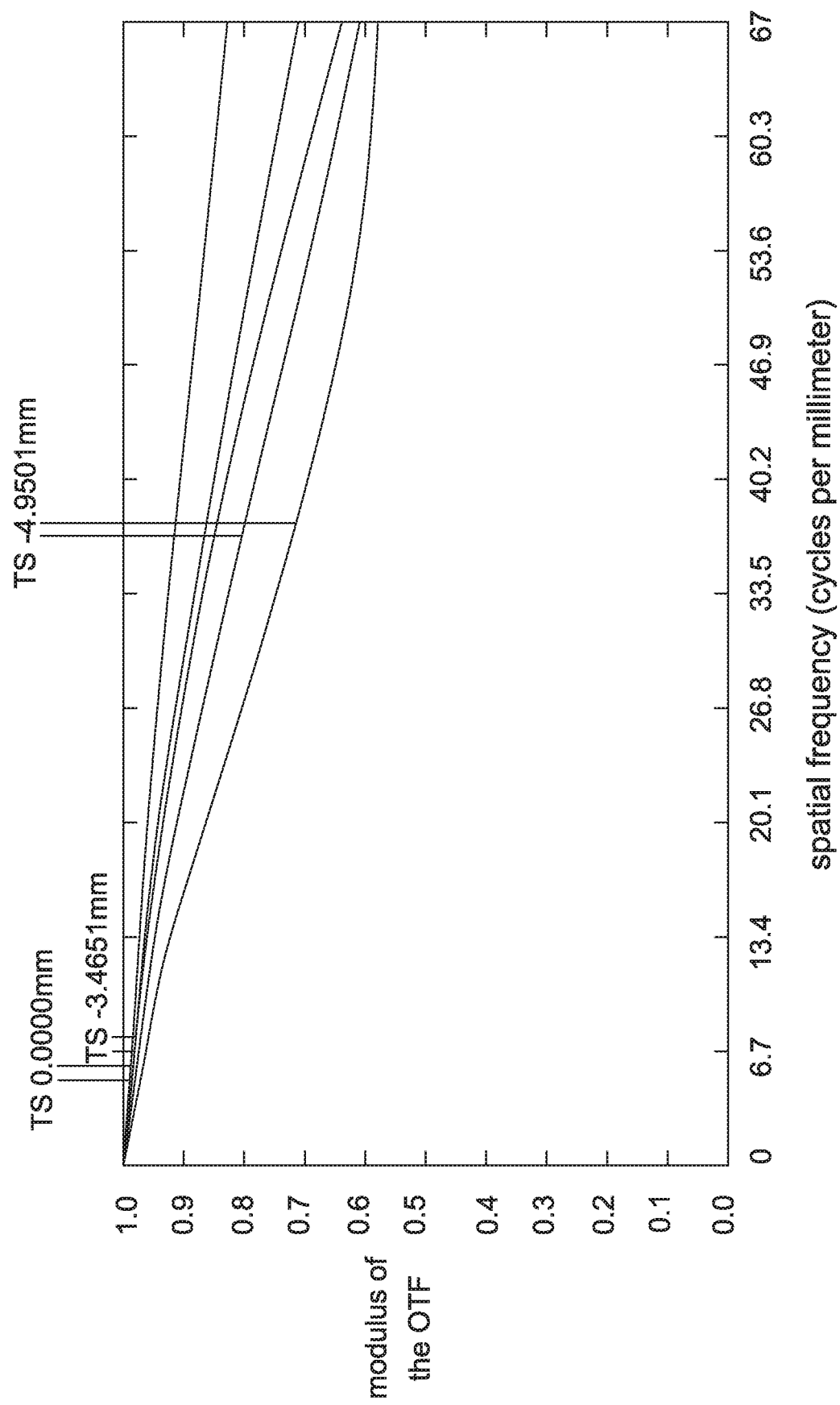

FIGS. 6-8 show optical simulation results of the image-space telecentric lens shown in FIG. 5. FIG. 6 is a through focus MTF diagram, and FIG. 8 is a spatial frequency MTF diagram. FIG. 7A illustrates astigmatic field curves, and FIG. 7B illustrates percentage distortion curves, where it shows that an absolute value of a maximum optical distortion is smaller than 0.25%.

A third design example of an image-space telecentric lens 10c including seven lenses L1-L7 (with respective refractive power of negative, negative, positive, negative, positive, negative and positive) is described in detail below with reference to FIG. 9. The lens L4, lens L5 and lens L6 are joined together as one piece to form a cemented triplet C1 having positive refractive power. The detailed optical data of the third example are shown in Table 7 and Table 8, and the aspheric surface data are shown in Table 9 below.

TABLE 7

| Surface | object | radius (mm) | thickness (mm) | refractive index | Abbe number |
|---|---|---|---|---|---|
| S1 | LensL1(meniscus) | 6.78 | 1.79 | 1.525 | 56.3 |
| S2 | | 3.35 | 10.38 | | |
| S3 | Lens L2(meniscus) | −7.38 | 4.13 | 1.525 | 56.3 |
| S4 | | −10.51 | 0.10 | | |
| S5 | Lens L3(biconvex) | 21.63 | 2.34 | 1.883 | 40.8 |
| S6 | | −79.29 | 7.07 | | |
| S7 | Stop | ∞ | 5.01 | | |
| S8 | Lens L4(meniscus) | 83.32 | 0.70 | 1.596 | 39.2 |
| S9 | Lens L5(biconvex) | 9.29 | 6.10 | 1.618 | 63.3 |
| S10 | Lens L6(meniscus) | −7.81 | 3.69 | 1.921 | 24.0 |
| S11 | | −14.83 | 0.50 | | |
| S12 | Lens L7(meniscus) | 110.89 | 4.07 | 1.525 | 56.3 |
| S13 | | −16.00 | 0.51 | | |

TABLE 8

| | |
|---|---|
| EFL (mm) | 7.84 |
| TT (mm) | 45.88 |
| H (mm) | 5.20 |
| CA(mm) | 18.00 |
| F number | 1.60 |
| Throw ratio | 1.12 |
| TT/EFL | 5.85 |
| H/EFL | 0.66 |
| CA/H | 3.46 |

TABLE 9

| Lens surface | S1 | S2 | S3 | S4 | S12 | S13 |
|---|---|---|---|---|---|---|
| K | −1.60E+00 | −1.88E+00 | −3.72E−01 | −6.39E−01 | 0 | 0 |
| A | −1.21E−03 | 1.10E−03 | 1.40E−04 | 3.48E−05 | −2.94E−04 | −1.76E−04 |
| B | 2.47E−05 | −5.48E−05 | −2.59E−07 | 5.62E−08 | −4.50E−06 | −2.88E−06 |
| C | −2.97E−07 | 2.38E−06 | 3.30E−08 | −5.55E−09 | 1.26E−07 | 6.39E−08 |
| D | 2.03E−09 | −5.62E−08 | −9.06E−10 | 1.68E−10 | −5.17E−09 | −1.72E−09 |
| E | −5.80E−12 | 6.74E−10 | 2.00E−11 | −4.55E−13 | 9.42E−11 | 2.21E−11 |
| F | −2.21E−16 | −2.97E−12 | 0 | 0 | −8.10E−13 | −1.54E−13 |

Figure 9:
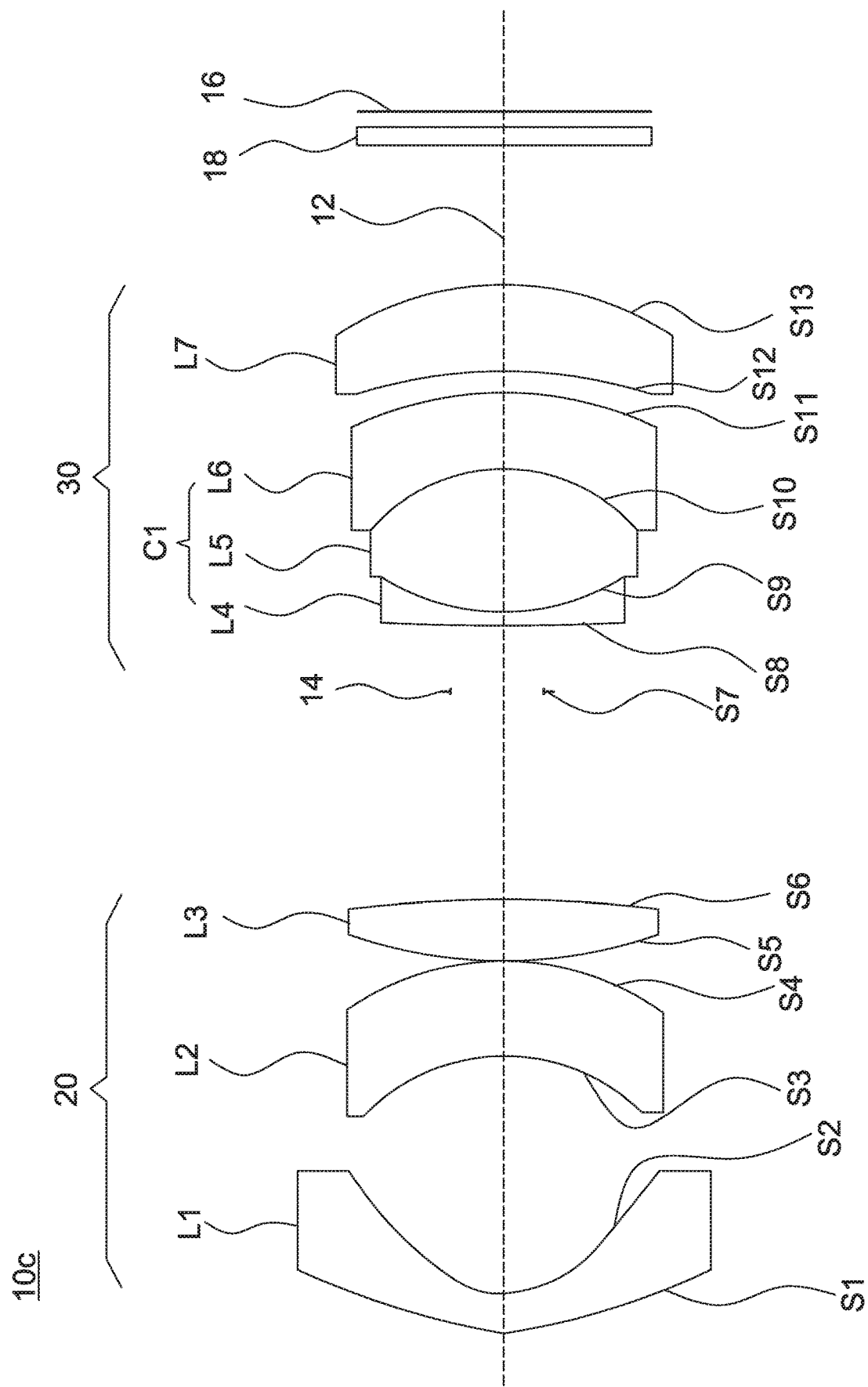
FIG. 9 shows a schematic diagram illustrating an image-space telecentric lens according to another embodiment of the invention.
Figure 10:
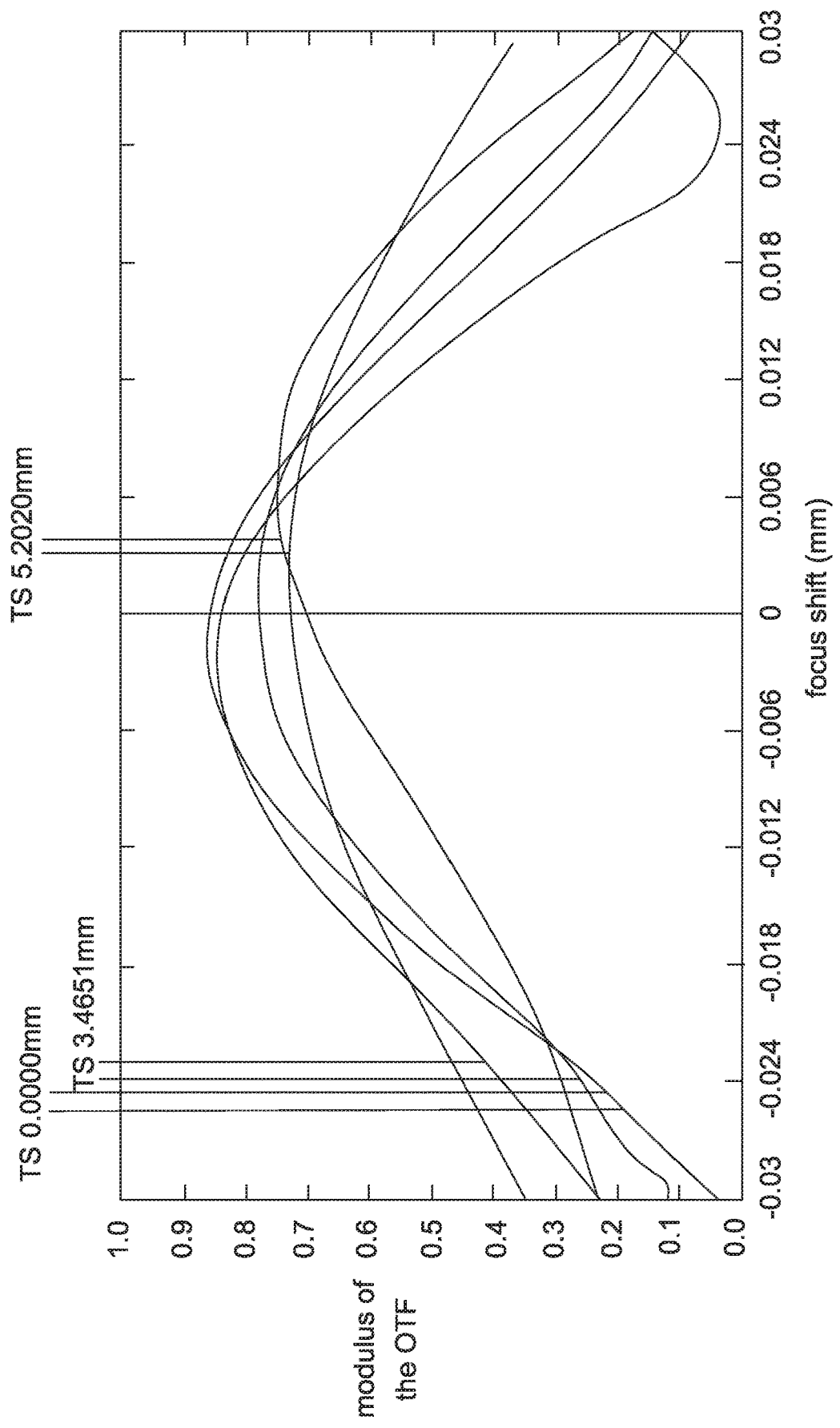
FIGS. 10, 11A, 11B and 12 show optical simulation results of the image-space telecentric lens shown in FIG. 9.
Figures 11A, 11B:
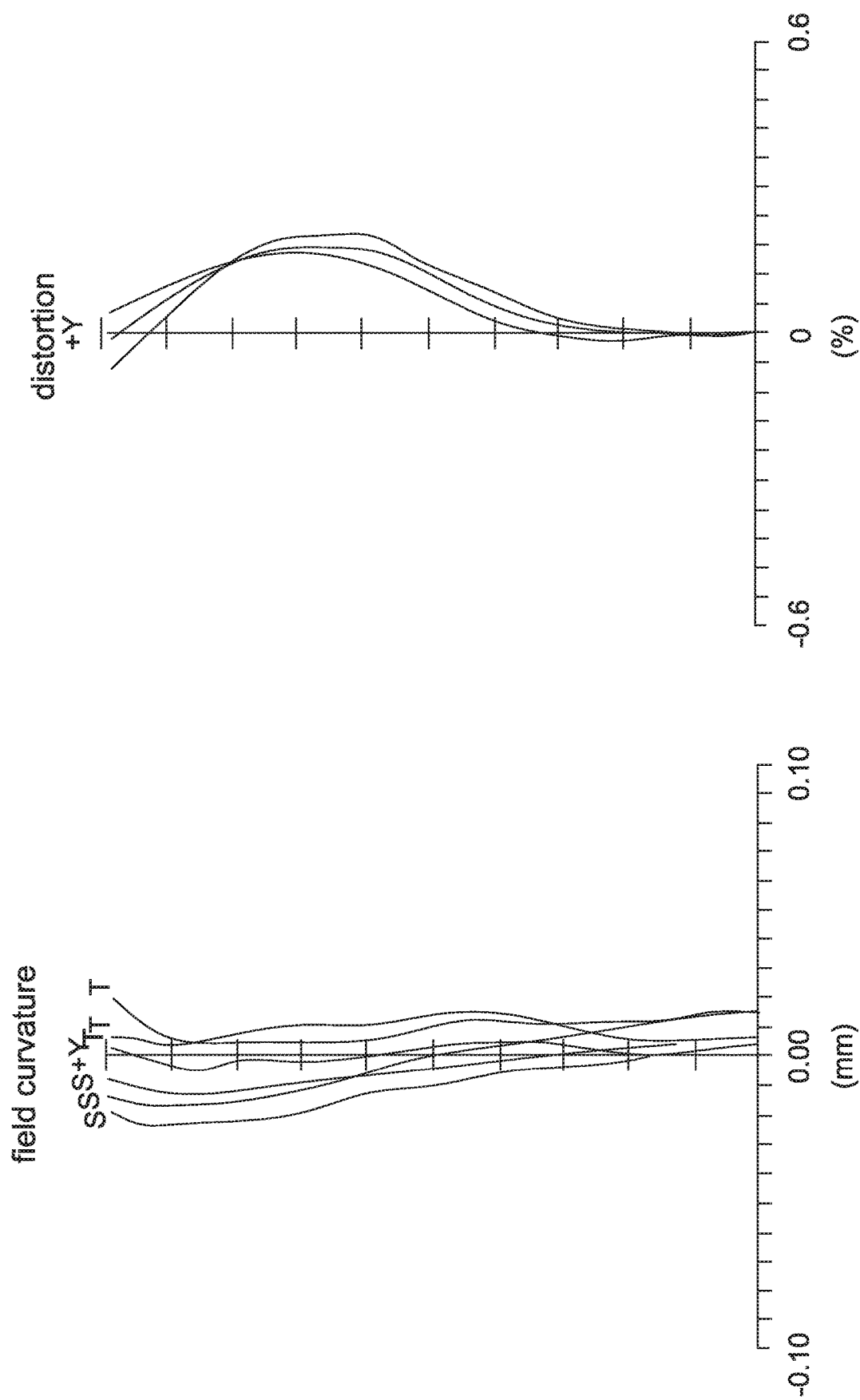
Figure 12:
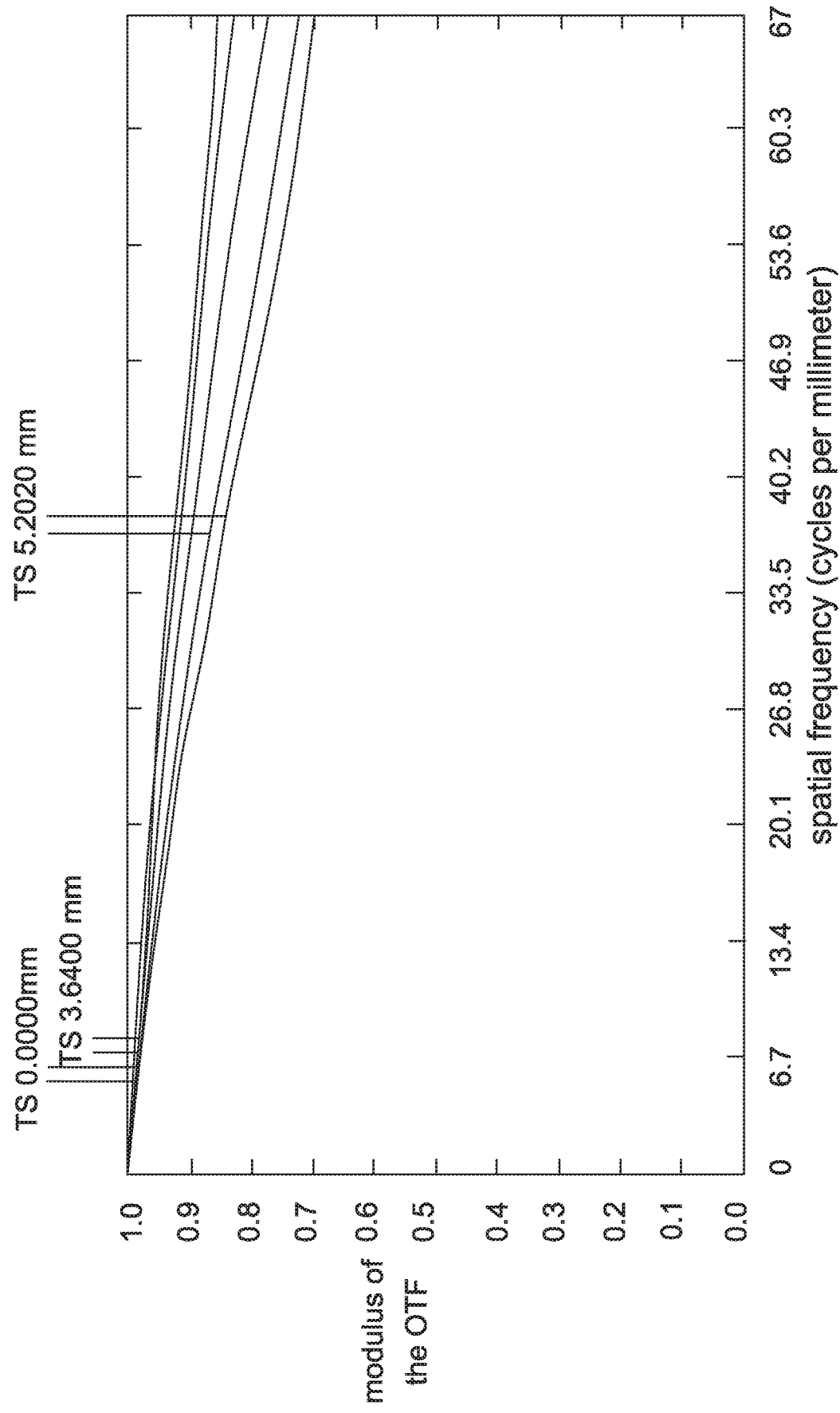

FIGS. 10-12 show optical simulation results of the image-space telecentric lens shown in FIG. 9. FIG. 10 is a through focus MTF diagram, and FIG. 12 is a spatial frequency MTF diagram. FIG. 11A illustrates astigmatic field curves, and FIG. 11B illustrates percentage distortion curves, where it shows that an absolute value of a maximum optical distortion is smaller than 0.2%.

A fourth design example of an image-space telecentric lens 10d including eight lenses L1-L8 (with respective refractive power of negative, negative, positive, negative, positive, negative, positive and positive) is described in detail below with reference to FIG. 13. The lens L4, lens L5 and lens L6 are joined together as one piece to form a cemented triplet C1 having positive refractive power. The detailed optical data of the fourth example are shown in Table 10 and Table 11, and the aspheric surface data are shown in Table 12 below.

Figure 13:
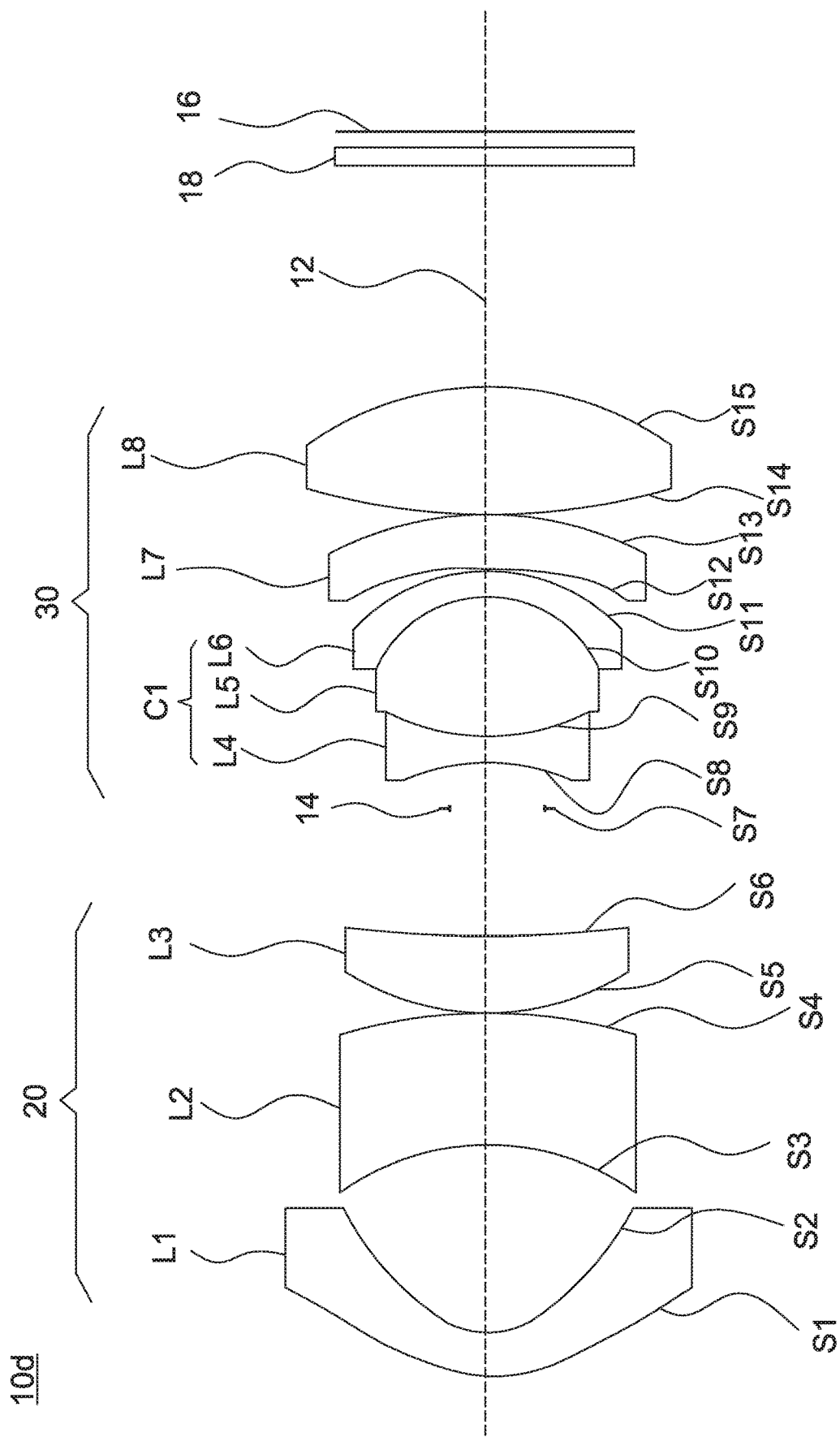
FIG. 13 shows a schematic diagram illustrating an image-space telecentric lens according to another embodiment of the invention.
Figure 14:
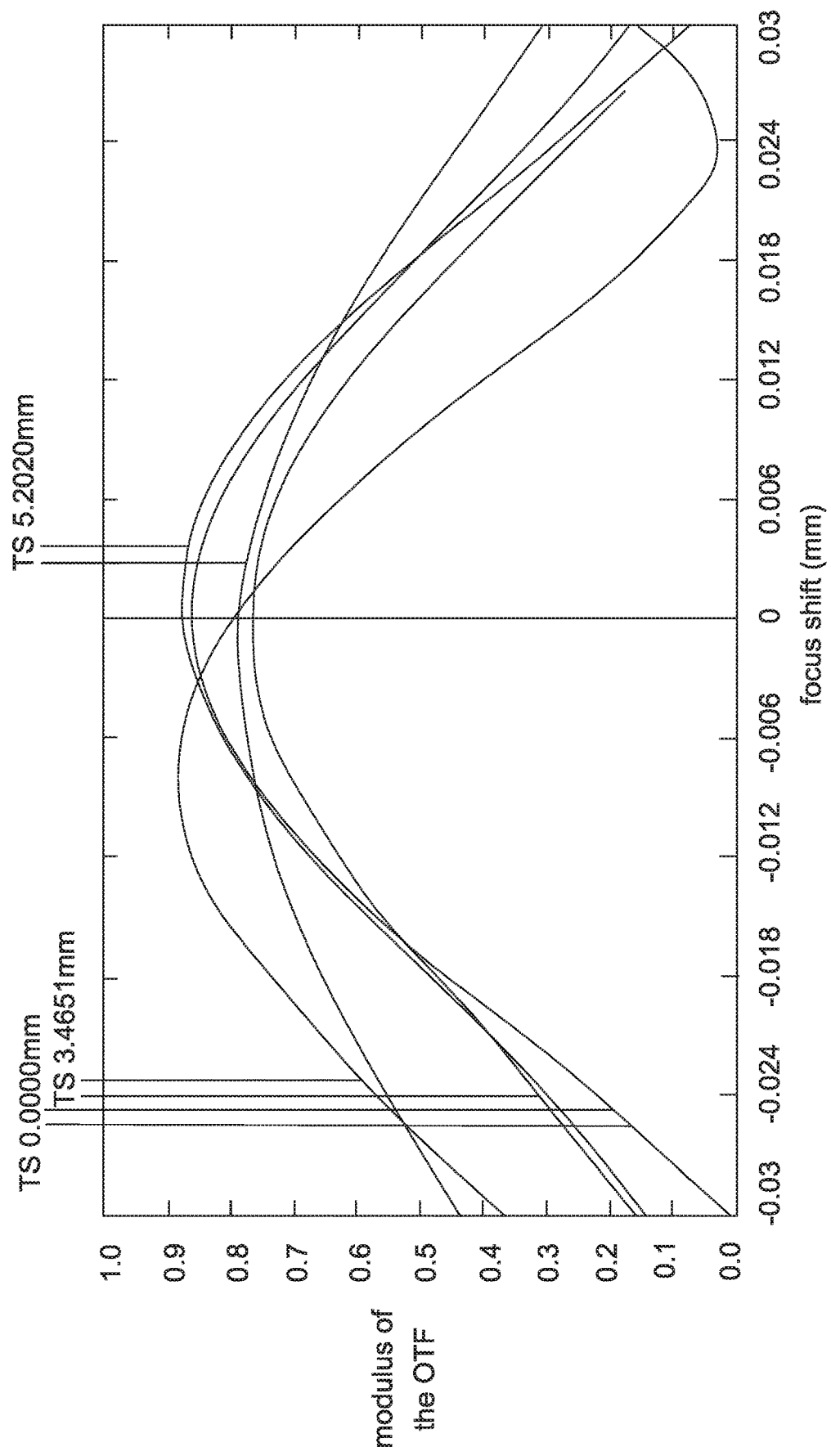
FIGS. 14, 15A, 15B and 16 show optical simulation results of the image-space telecentric lens shown in FIG. 13.
Figure 15A:
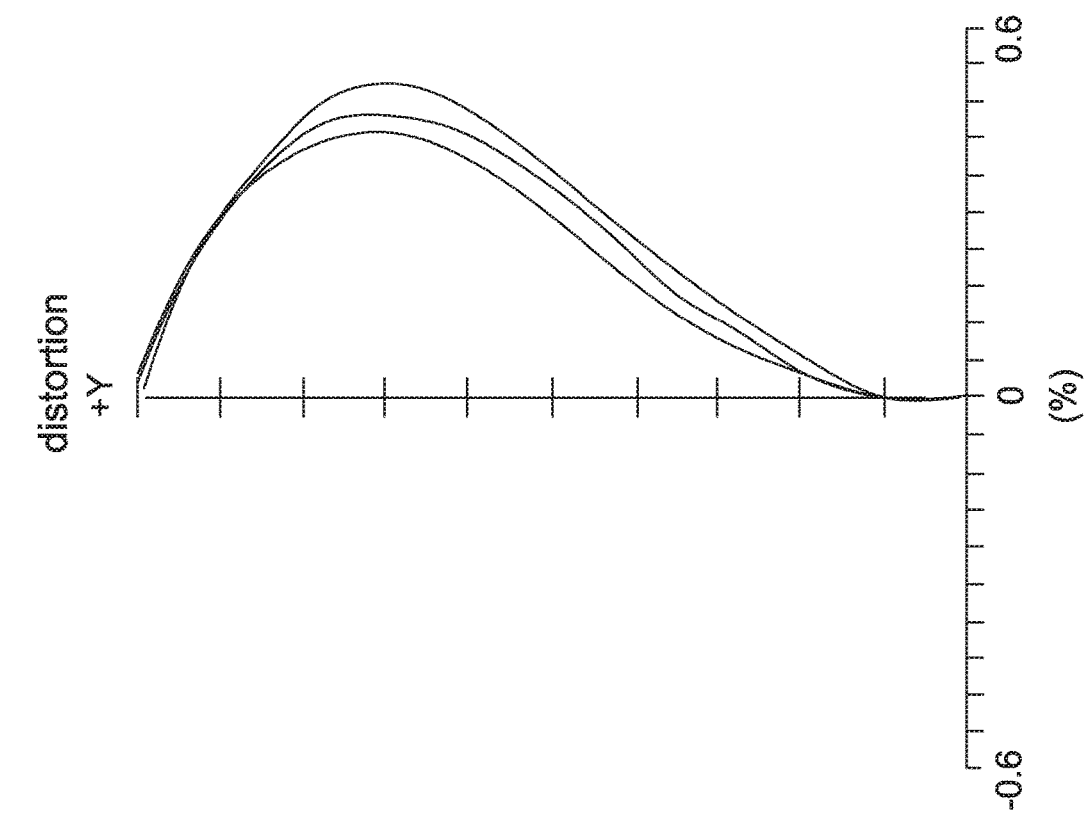
Figure 15B:
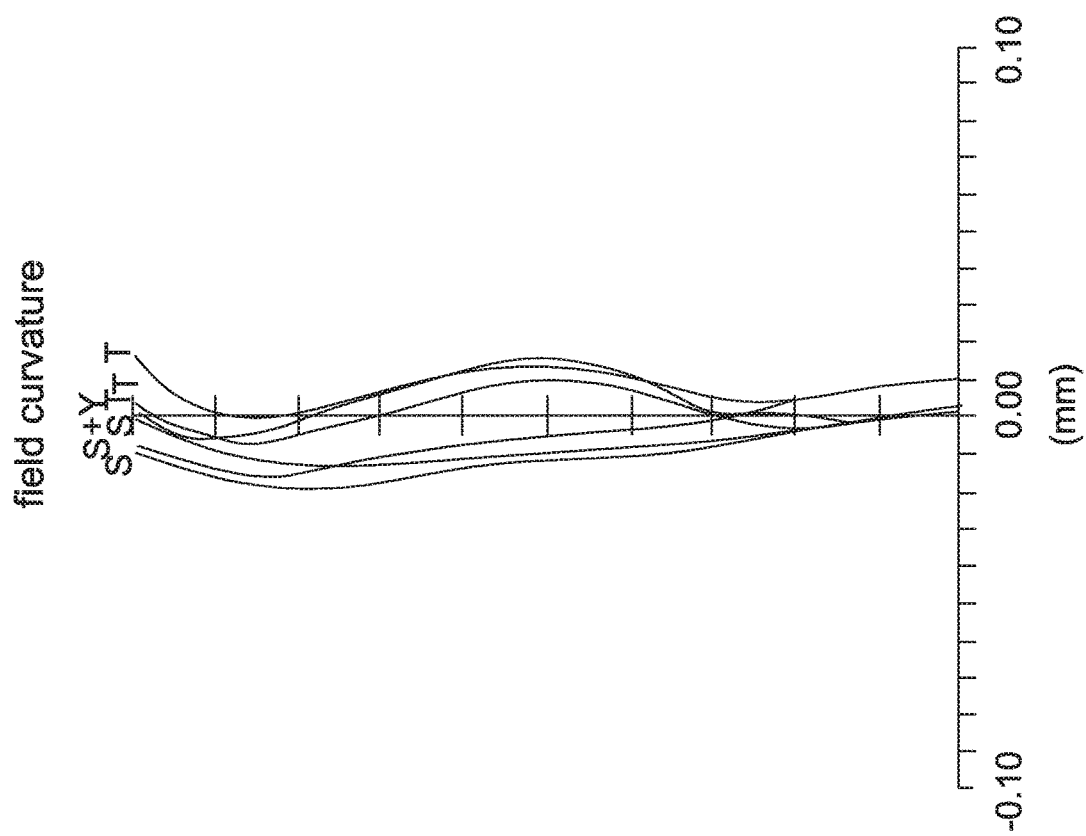
Figure 16:
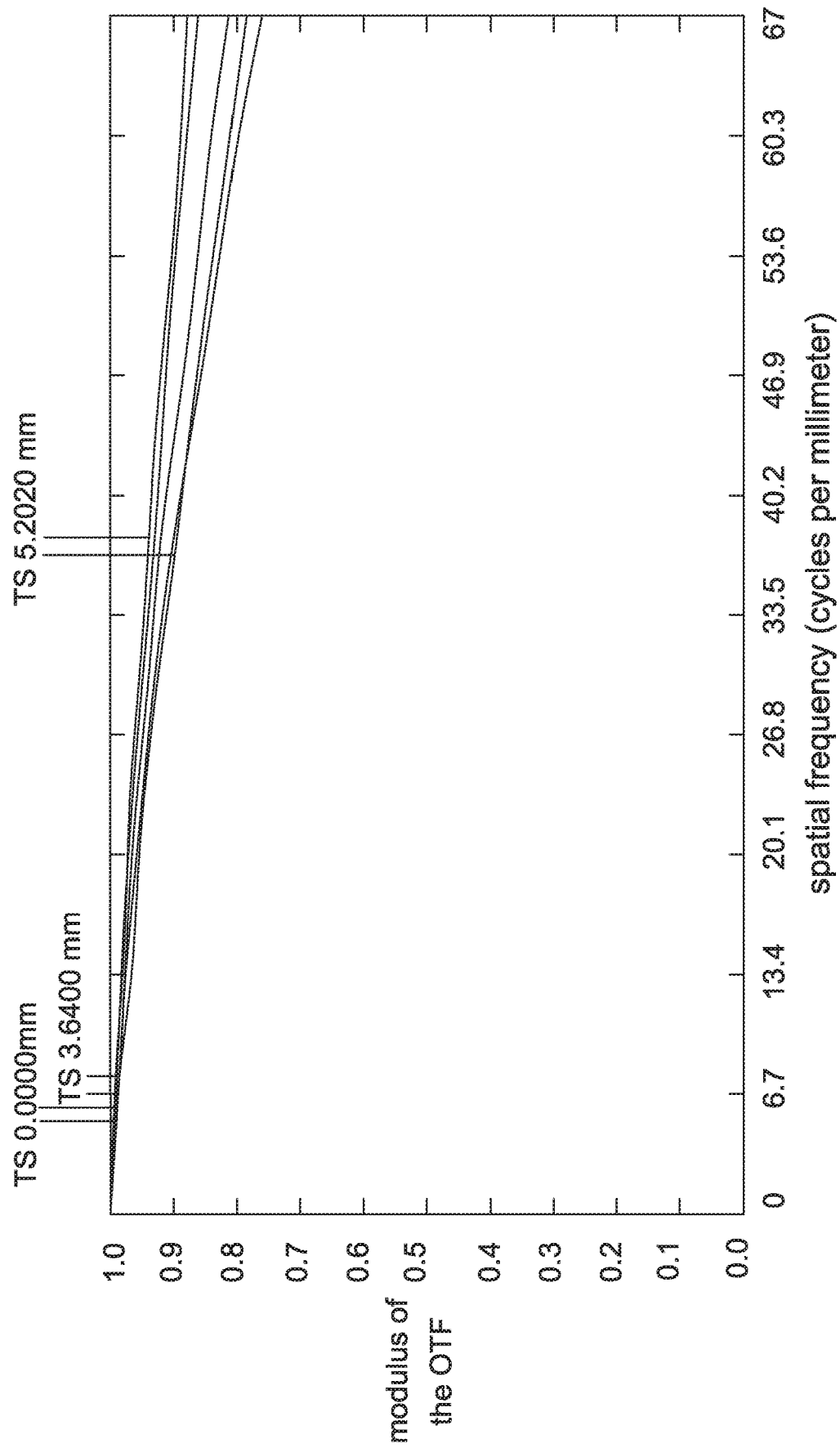

FIGS. 14-16 show optical simulation results of the image-space telecentric lens shown in FIG. 13. FIG. 14 is a through focus MTF diagram, and FIG. 16 is a spatial frequency MTF diagram. FIG. 15A illustrates astigmatic field curves, and FIG. 15B illustrates percentage distortion curves, where it shows that an absolute value of a maximum optical distortion is smaller than 0.6%.

A fifth design example of an image-space telecentric lens 10e including seven lenses L1-L7 (with respective refractive power of negative, negative, positive, positive, negative, positive and positive) is described in detail below with reference to FIG. 17. The lens L4 and lens L5 are joined together as one piece to form a cemented doublet D1 having positive refractive power. The detailed optical data of the fifth example are shown in Table 13 and Table 14, and the aspheric surface data are shown in Table 15 below.

TABLE 10

| Surface | object | radius (mm) | thickness (mm) | refractive index | Abbe number |
|---|---|---|---|---|---|
| S1 | LensL1(meniscus) | 5.91 | 1.86 | 1.525 | 56.3 |
| S2 | | 3.25 | 8.22 | | |
| S3 | Lens L2(meniscus) | −8.59 | 5.87 | 1.525 | 56.3 |
| S4 | | −15.19 | 0.10 | | |
| S5 | Lens L3(meniscus) | 12.11 | 3.40 | 1.835 | 42.7 |
| S6 | | 159.07 | 5.60 | | |
| S7 | stop | ∞ | 1.79 | | |
| S8 | Lens L4(biconcave) | −11.77 | 1.20 | 1.532 | 48.8 |
| S9 | Lens L5(biconvex) | 9.78 | 6.04 | 1.497 | 81.5 |
| S10 | Lens L6(meniscus) | −5.37 | 1.20 | 1.904 | 31.3 |
| S11 | | −8.05 | 0.10 | | |
| S12 | Lens L7(meniscus) | −29.14 | 2.39 | 1.525 | 56.3 |
| S13 | | −19.89 | 0.10 | | |
| S14 | Lens L8(biconvex) | 29.15 | 5.50 | 1.497 | 81.5 |
| S15 | | −13.61 | 0.95 | | |

TABLE 13

| Surface | object | radius (mm) | thickness (mm) | refractive index | Abbe number |
|---|---|---|---|---|---|
| S1 | LensL1(meniscus) | 6.12 | 2.17 | 1.525 | 56.3 |
| S2 | | 3.23 | 8.62 | | |
| S3 | Lens L2(meniscus) | −8.20 | 5.49 | 1.525 | 56.3 |
| S4 | | −13.13 | 0.10 | | |
| S5 | Lens L3(meniscus) | 10.88 | 3.46 | 1.800 | 42.2 |
| S6 | | 51.75 | 5.82 | | |
| S7 | Stop | ∞ | 2.31 | | |
| S8 | Lens L4(meniscus) | −11.85 | 4.19 | 1.497 | 81.5 |
| S9 | Lens L5(meniscus) | −4.90 | 1.20 | 1.921 | 24.0 |
| S10 | | −7.82 | 0.10 | | |
| S11 | Lens L6(meniscus) | −16.12 | 4.61 | 1.525 | 56.3 |
| S12 | | −12.03 | 0.10 | | |
| S13 | Lens L7(biconvex) | 30.80 | 5.43 | 1.497 | 81.5 |
| S14 | | −13.36 | 0.82 | | |

TABLE 11

| EFL (mm) | 7.69 |
|---|---|
| TT (mm) | 43.36 |
| H (mm) | 5.20 |
| CA(mm) | 17.70 |
| F number | 1.70 |
| Throw ratio | 1.10 |
| TT/EFL | 5.64 |
| H/EFL | 0.68 |
| CA/H | 3.40 |

TABLE 14

| EFL (mm) | 7.67 |
|---|---|
| TT (mm) | 43.60 |
| H (mm) | 5.20 |
| CA(mm) | 18.20 |
| F number | 1.70 |
| Throw ratio | 1.10 |
| TT/EFL | 5.69 |
| H/EFL | 0.68 |
| CA/H | 3.50 |

TABLE 12

| Lens surface | S1 | S2 | S3 | S4 | S12 | S13 |
|---|---|---|---|---|---|---|
| K | −7.08E−01 | −1.57E+00 | 0 | 0 | 0 | 0 |
| A | −1.07E−03 | 1.14E−03 | 4.21E−04 | 1.68E−04 | −5.56E−04 | −2.95E−04 |
| B | 7.34E−06 | −3.13E−05 | −9.98E−07 | −4.97E−07 | −8.12E−07 | 7.67E−08 |
| C | −2.82E−08 | 6.36E−07 | 5.84E−08 | 2.21E−08 | −5.38E−08 | 9.76E−09 |
| D | −1.92E−10 | −2.93E−09 | −2.55E−10 | −2.89E−10 | 3.13E−09 | 7.48E−10 |
| E | 6.84E−13 | −4.39E−11 | −8.65E−13 | 2.62E−12 | −1.36E−12 | 2.10E−12 |

TABLE 15

| Lens surface | S1 | S2 | S3 | S4 | S11 | S12 |
|---|---|---|---|---|---|---|
| K | −7.12E−01 | −1.56E+00 | 0 | 0 | 0 | 0 |
| A | −9.09E−04 | 1.27E−03 | 4.52E−04 | 1.86E−04 | −3.66E−04 | −2.99E−05 |
| B | 5.94E−06 | −3.04E−05 | 9.81E−07 | 1.85E−07 | −6.92E−07 | 1.01E−06 |
| C | −3.09E−08 | 6.46E−07 | 6.64E−09 | −1.97E−09 | 1.29E−07 | 1.71E−08 |
| D | −4.78E−11 | −5.25E−09 | 5.36E−10 | 1.95E−10 | 8.91E−10 | 4.93E−10 |
| E | 2.43E−13 | −1.87E−11 | 0 | 0 | 0 | 0 |

Figure 17:
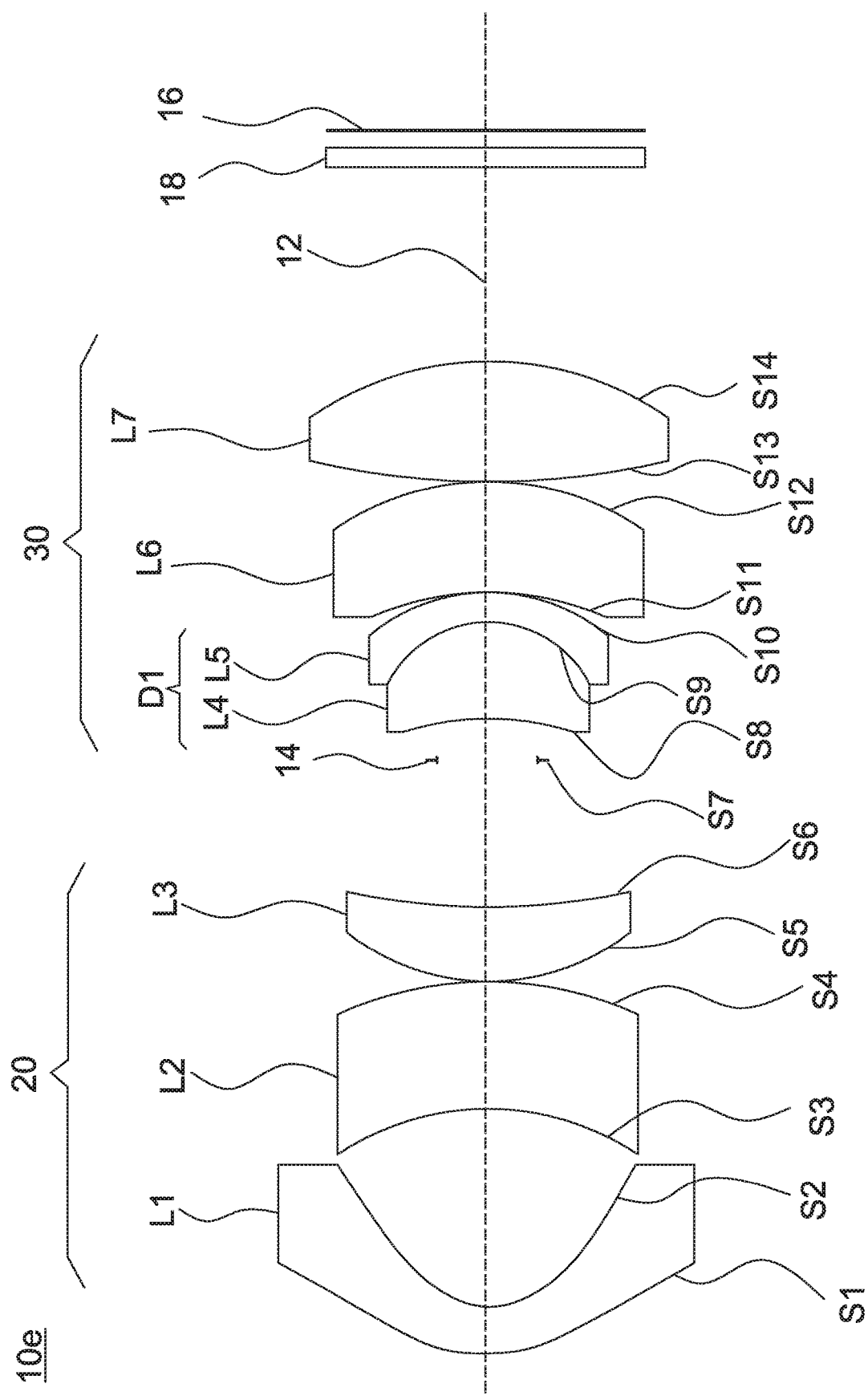
FIG. 17 shows a schematic diagram illustrating an image-space telecentric lens according to another embodiment of the invention.
Figure 18:
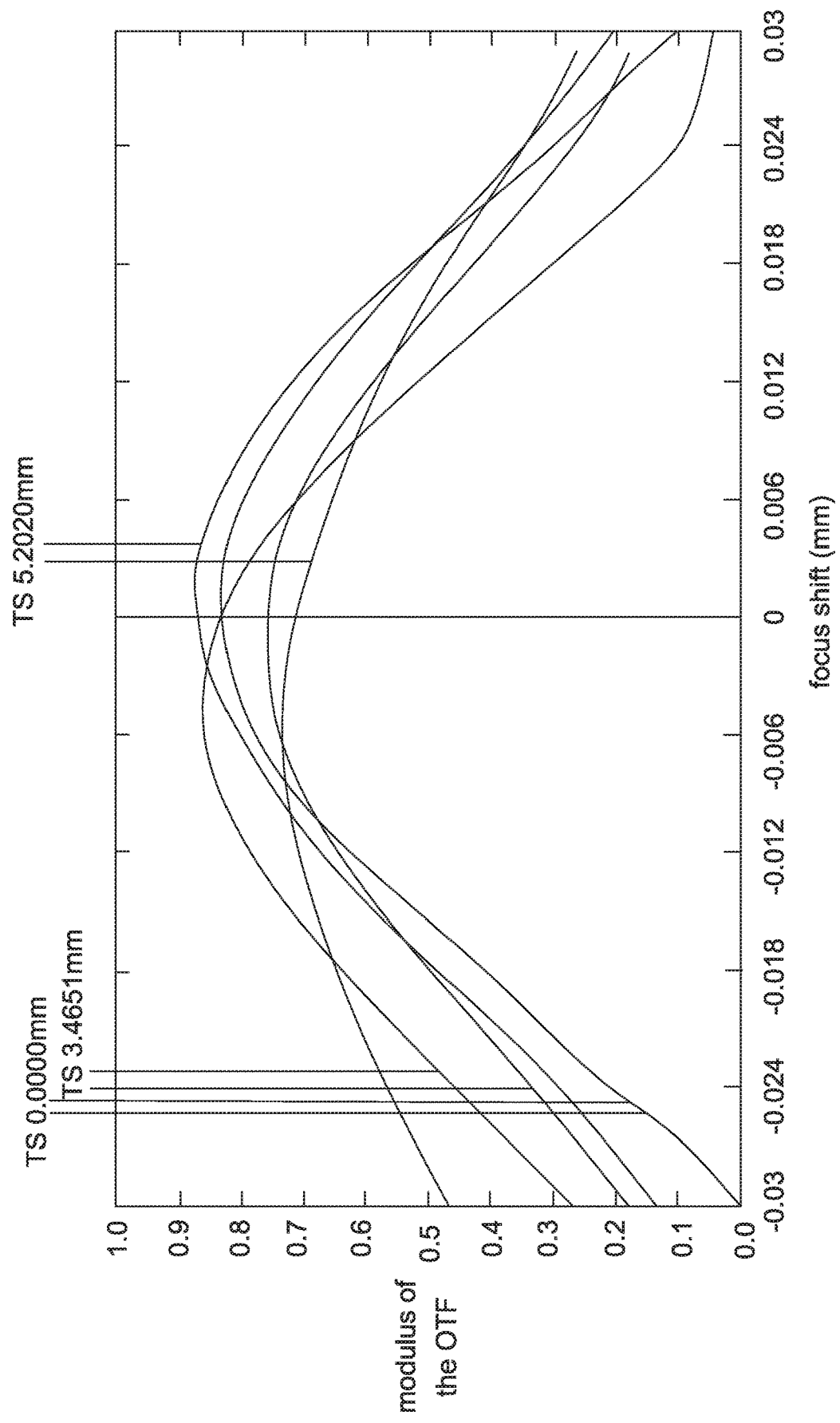
FIGS. 18, 19A, 19B and 20 show optical simulation results of the image-space telecentric lens shown in FIG. 17.
Figure 19B:
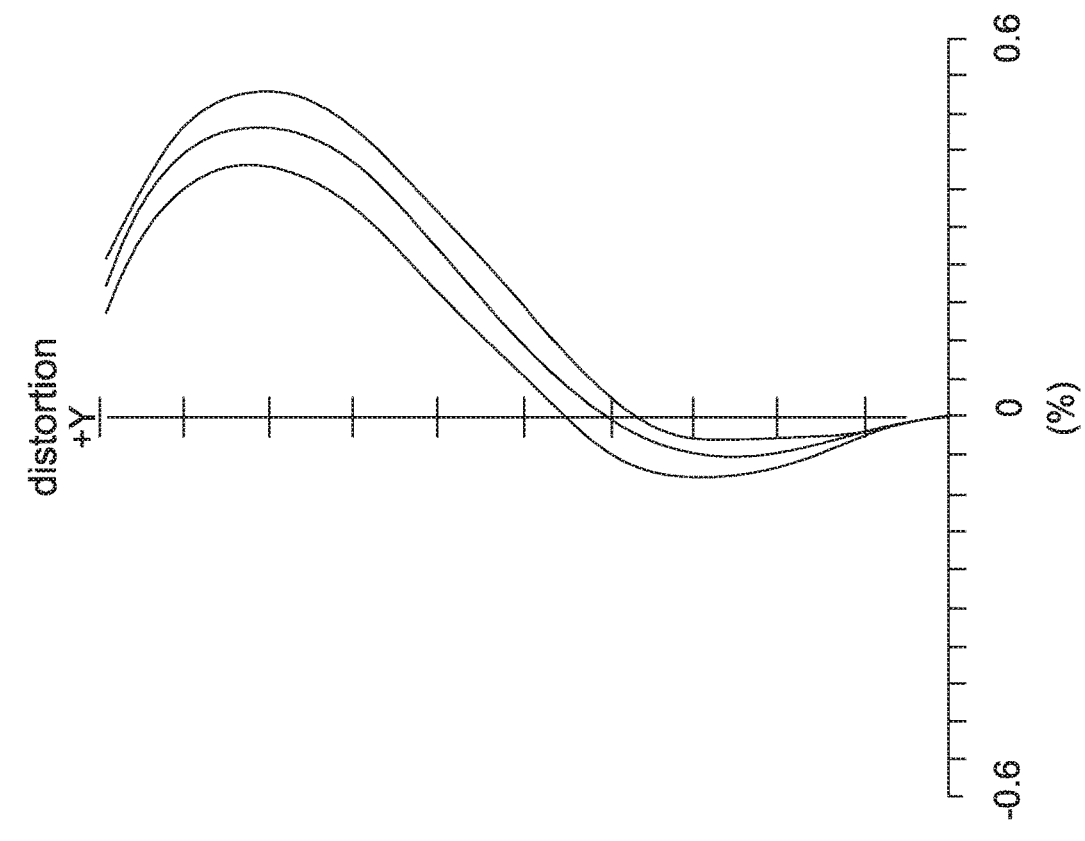
Figure 19A:
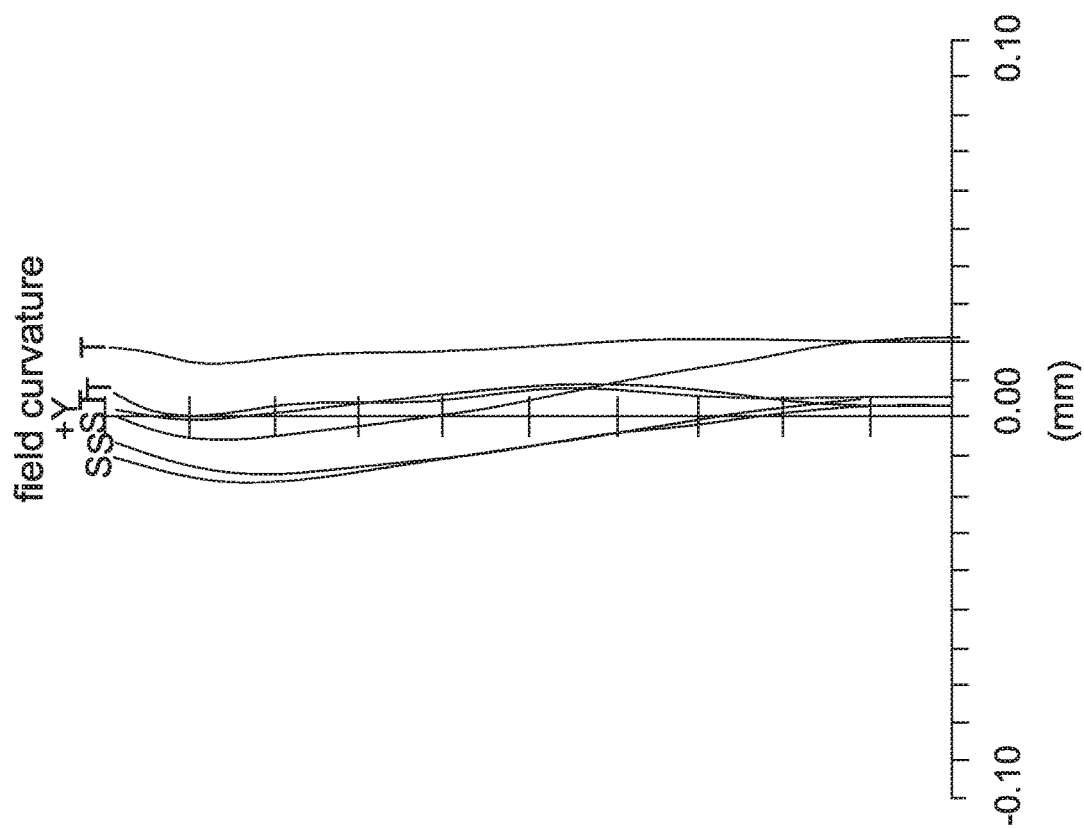
Figure 20:
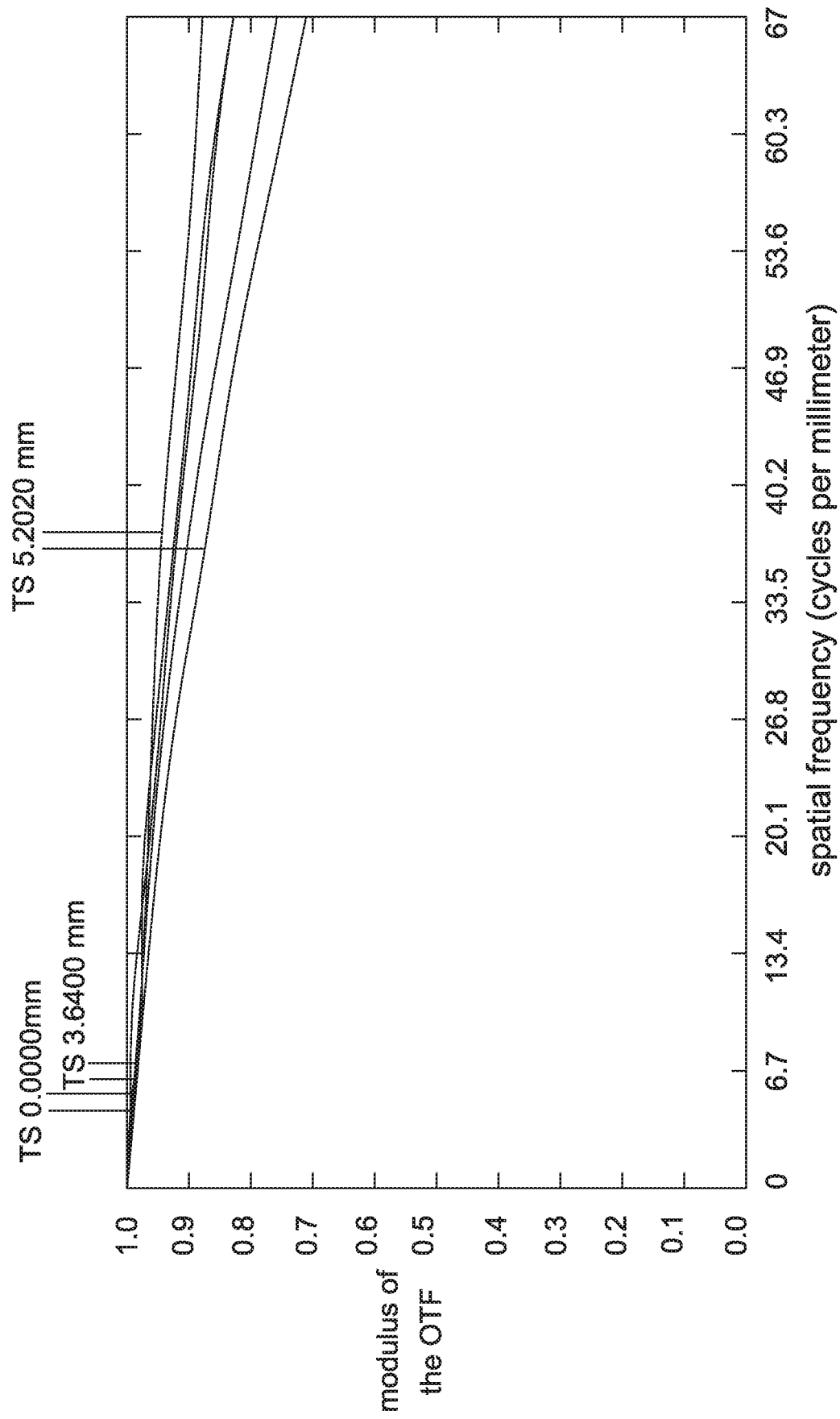

FIGS. 18-20 show optical simulation results of the image-space telecentric lens shown in FIG. 17. FIG. 18 is a through focus MTF diagram, and FIG. 20 is a spatial frequency MTF diagram. FIG. 19A illustrates astigmatic field curves, and FIG. 19B illustrates percentage distortion curves, where it shows that an absolute value of a maximum optical distortion is smaller than 0.6%.

The simulated results are within permitted ranges specified by the standard, which indicates the image-space telecentric lens according to the above design examples may achieve good imaging quality.

According to the above embodiments, the second lens group has a cemented lens of positive refractive power immediately adjacent to the aperture stop; that is, the cemented lens of positive refractive power is nearest the aperture stop as compared with other lens in the second lens group. As a result, the cemented lens of positive refractive power is allowed to balance chromatic aberration and reduce optical distortion.

Note the parameters listed in Tables 1-15 are only for exemplified purposes but do not limit the invention. It should be appreciated that variations about the design parameters or setting may be made in the embodiments by persons skilled in the art without departing from the scope of the invention. Therefore, any image-space telecentric lens of the same structure is considered to be within the scope of the present disclosure even if it uses different data. The embodiments depicted above and the appended drawings are exemplary and are not intended to limit the scope of the present disclosure.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. An image-space telecentric fixed focal lens comprising in order from a magnified side to a minified side:
    a first lens group having negative refractive power and at least one aspheric lens;
    an aperture stop; and
    a second lens group having positive refractive power and at least four lenses, the at least four lenses including one aspheric lens and a cemented triplet of positive refractive power, the cemented triplet being nearest the aperture stop as compared with other lens in the second lens group, wherein a total number of lenses having refractive power in the image-space telecentric fixed focal lens is no more than nine, and the conditions:
    TT<100 mm and 0.5<H/EFL<0.94 are satisfied, where TT denotes a length measured along an optical axis and between two outermost opposite lens surfaces of the image-space telecentric fixed focal lens, H denotes a maximum image height at the minified side, and EFL denotes an effective focal length of the image-space telecentric fixed focal lens.

2. The image-space telecentric fixed focal lens as claimed in claim 1, wherein the cemented triplet comprises in order from the magnified side to the minified side:
    a lens of negative refractive power;
    a lens of positive refractive power; and
    a lens of negative refractive power.

3. The image-space telecentric fixed focal lens as claimed in claim 1, wherein the second lens group further comprises:
    at least one lens of positive refractive power, wherein the cemented triplet is located between the aperture stop and the at least one lens of positive refractive power.

4. The image-space telecentric fixed focal lens as claimed in claim 1, wherein the first lens group comprises:
    a first lens of negative refractive power; and
    a second lens of positive refractive power located between the first lens and the aperture stop.

5. The image-space telecentric fixed focal lens as claimed in claim 1, wherein the first lens group comprises:
a first lens of negative refractive power;
a second lens of negative refractive power located between the first lens and the aperture stop; and
a third lens of positive refractive power located between the second lens and the aperture stop.

6. An image-space telecentric fixed focal lens comprising in order from a magnified side to a minified side:
a first lens group having negative refractive power;
an aperture stop; and
a second lens group having positive refractive power, wherein the second lens group has an cemented triplet of positive refractive power, the cemented triplet is nearest the aperture stop as compared with other lens in the second lens group, wherein a total number of lenses having refractive power in the image-space telecentric fixed focal lens is four to nine, and the conditions: CA/H<5 and 0.5<H/EFL<0.9 are satisfied, where H denotes a maximum image height at the minified side, and CA denotes a clear aperture defined as a length between two opposite points of discontinuity of a magnified-side surface of a lens nearest the magnified-side in the first lens group, and EFL denotes an effective focal length of the image-space telecentric fixed focal lens.

7. The image-space telecentric fixed focal lens as claimed in claim 6, wherein the condition:
2.5 TT/EFL<6.5 is satisfied, where TT denotes a length measured along an optical axis and between two outermost opposite lens surfaces of the image-space telecentric fixed focal lens, and EFL denotes an effective focal length of the image-space telecentric fixed focal lens.

8. The image-space telecentric fixed focal lens as claimed in claim 6, wherein the image-space telecentric fixed focal lens satisfies at least one of the following conditions:
(1) a throw ratio of the image-space telecentric fixed focal lens is in the range of 0.8-1.5;
(2) an F number of the image-space telecentric fixed focal lens is in the range of 1.7-2.4;
(3) an optical distortion of the image-space telecentric fixed focal lens is smaller than 0.6%.

9. The image-space telecentric fixed focal lens as claimed in claim 6, wherein the condition TT<100 mm is satisfied, where TT denotes a length measured along an optical axis and between two outermost opposite lens surfaces of the image-space telecentric fixed focal lens.

10. The image-space telecentric fixed focal lens as claimed in claim 6, wherein the first lens group has an aspheric lens, and the aspheric lens is located furthest from the aperture stop as compared with other lens in the first lens group.

11. The image-space telecentric fixed focal lens as claimed in claim 10, wherein the aspheric lens of the first lens group has a refractive index in the range of 1.48-1.55.

12. The image-space telecentric fixed focal lens as claimed in claim 6, wherein the second lens group has an aspheric lens, and the aspheric lens is located furthest from the aperture stop as compared with other lens in the second lens group.

13. The image-space telecentric fixed focal lens as claimed in claim 12, wherein the aspheric lens of the second lens group has a refractive index in the range of 1.48-1.55.

14. An image-space telecentric fixed focal lens comprising in order from a first side to a second side:
a first lens having refractive power;
a second lens having refractive power, wherein an overall refractive power of the first lens and the second lens is negative;
an aperture stop;
a third lens having refractive power;
a fourth lens having refractive power;
a fifth lens having refractive power; and
a sixth lens having refractive power, wherein an overall refractive power of the third lens, the fourth lens, the fifth lens and the sixth lens is positive, the third lens, the fourth lens and the fifth lens are joined together to form a cemented triplet having positive refractive power, a total number of lenses having refractive power in the image-space telecentric fixed focal lens is no more than nine, and the condition:
2.5<TT/EFL<6.5 is satisfied, where TT denotes a length measured along an optical axis and between two outermost opposite lens surfaces of the image-space telecentric fixed focal lens, and EFL denotes an effective focal length of the image-space telecentric fixed focal lens.

15. The image-space telecentric fixed focal lens as claimed in claim 14, wherein the condition TT<100 mm is satisfied.

* * * * *